US006876365B1

(12) United States Patent
Tsutsui et al.

(10) Patent No.: US 6,876,365 B1
(45) Date of Patent: Apr. 5, 2005

(54) SIGNAL PROCESSING CIRCUIT FOR DISPLAY DEVICE

(75) Inventors: Yusuke Tsutsui, Hashima (JP); Mitsugu Kobayashi, Nagoya (JP); Makoto Kitagawa, Gifu (JP)

(73) Assignee: Sanyo Electric Co., Ltd, Osaka (JP)

( * ) Notice: Subject to any disclaimer, the term of this patent is extended or adjusted under 35 U.S.C. 154(b) by 228 days.

(21) Appl. No.: 09/604,301

(22) Filed: Jun. 26, 2000

(30) Foreign Application Priority Data

Jun. 25, 1999 (JP) .......................................... 11-179936
Jun. 25, 1999 (JP) .......................................... 11-179937
Jun. 25, 1999 (JP) .......................................... 11-179938

(51) Int. Cl.[7] ................................................ G06F 13/00

(52) U.S. Cl. ....................... 345/536; 345/560; 345/547; 345/51; 345/100; 345/204

(58) Field of Search ........................... 345/28, 51, 547, 345/544, 536, 537, 572, 531, 554, 560, 196, 100, 98, 87, 50, 29

(56) References Cited

U.S. PATENT DOCUMENTS 4,985,698 A * 1/1991 Mano et al.
5,977,944 A * 11/1999 Kubota et al.
6,020,871 A * 2/2000 Asada
6,597,349 B1 * 7/2003 Koyama et al. ............ 345/204

* cited by examiner

*Primary Examiner*—Matthew C. Bella
*Assistant Examiner*—Hau Nguyen
(74) *Attorney, Agent, or Firm*—Hogan & Hartson, LLP

(57) ABSTRACT

An input digital video signal is allotted by a first multiplexer (310) between regions of a display area to be driven in a dividing manner and is sequentially input to a first memory portion (30A) or a second memory portion (30B). Each of the first and second memory portions (30A and 30B) comprises an input-side line memory (32) composed of, for example, 400-stage input side shift register to which said digital video signal is sequentially input, and an output-side line memory (34) for receiving the data transferred in parallel from the input line memory (32) to serially output the stored data from a selected one of output portions (Out1–4) provided at the 320th, 256th or first stage FF34. The output portion of the memory (34) is thus selected by selectors (380A, 380B) in accordance with the number of pixels in the horizontal direction of the LCD panel, such that LCD panels having the different numbers of pixels can be driven with the same structure. The output-side line memory (34) further includes a data shift direction switching circuit. By controlling the switching circuit and selecting the output at the first stage FF34(Out4) in the 400 stages, the data from the output-side line memory (34) can be output in the order opposite to the input order into the input-side line memory (32).

19 Claims, 17 Drawing Sheets

SIGNAL PROCESSING CIRCUIT FOR DISPLAY DEVICE

BACKGROUND OF THE INVENTION

1. Field of the Invention

The present invention relates to a drive circuit for a display device, such as a liquid crystal device (LCD), which displays images by controlling pixels according to a digital video signal, and more particularly to a signal processing circuit in a drive circuit for supplying display data to a display device in which a digital video signal is allotted to multiple phases in the horizontal direction to perform display.

2. Description of Related Art

An active matrix LCD, being one example of a conventional display device, will be described. FIG. 1 is a block diagram of a conventional LCD and a drive circuit therefor. As shown in FIG. 1, a conventional LCD panel comprises a plurality of data lines 102 extending in the vertical direction, a plurality of gate lines 103 extending in the horizontal direction, a data line selector 104 for sequentially selecting one of the data lines 102, a gate driver 105 for sequentially selecting one of the gate lines 103 and applying a gate voltage to the selected gate line, a thin film transistor (TFT) 106 and a pixel electrode 107 disposed at each of intersections between the data lines 102 and the gate lines 103, a data supply line 108 for supplying display data output from a signal processing circuit 101 which processes an input video signal to the data lines 102, and TFTs 109 each having a gate connected to the data line selector 104.

An externally applied digital video signal is input to the driver 101 which, for example, temporarily stores and converts the input signal into an analog signal (DA conversion) before sequentially outputting display data (a pixel voltage) to be applied to the pixel electrode of each pixel. The gate driver 105 selects one of the gate lines 103 for every one horizontal scanning period to apply a gate voltage thereto, such that the TFTs 106 in the selected row are placed into an on-state. The data line selector 104 selects one of the plurality of TFTs 109 and turns one of the data lines 102 into an active state, to which a pixel voltage is applied. In this manner a pixel voltage is applied, through the TFT 106 disposed at an intersection of the selected data line 102 and the selected gate line 103, to the pixel electrode 107 connected to the TFT 106. When a shift clock becomes a high level, the data line selector 104 selects the next data line 102, to which a pixel voltage is applied. In this manner, the data line selector 104 sequentially selects the data line 102 one by one, beginning from the one at the left end, during one horizontal scanning period, so that the next pixel is selected each time a shift clock becomes high, while the signal processing circuit 101 sequentially outputs a pixel voltage to be applied to each pixel.

An increase in the number of pixels and the level of precision for more recent LCDs has resulted in an accompanying increase in the number of pixels to which writing must be performed during one horizontal scanning period. As an example, the number of pixels in the horizontal direction has increased to 1280 in an SXGA (Super Extended Graphics Array) panel, which is twice as many as the 640 horizontal pixels of a VGA (Video Graphics Array) panel. Because the length of one horizontal period does not change as long as the number of the vertical lines remains unchanged, the frequency of a shift clock increases with an increase in the number of pixels, which in turn shortens the time available for voltage application for each pixel. When the number of vertical lines also increases, the length of one horizontal period itself is shortened. In this regard, however, there is the limit of the operation speed for the signal processing circuit 101 and of the response speed of the liquid crystal.

In view of the above problem, a control method has been proposed in which a video signal for one row is allotted to a plurality of phases such that a voltage is applied to a plurality of pixel electrodes in parallel. A control method in which a video signal is allotted to two phases will be described as an example of such a method.

FIG. 2 conceptually depicts an overall structure of an LCD in which a video signal is allotted in two phases. The structure of an LCD drive circuit of FIG. 2 differs from the structure shown in FIG. 1 in that it comprises a multiplexer 121 and a two-stage digital to analog converter (D/A) 122 and is so constructed that a data line selector 123 selects two data lines at the same time.

A video signal externally applied is allotted to either of two phases for each pixel by the multiplexer 121 before being input to the two-stage D/A 122. The two-stage D/A 122 processes data for two pixels simultaneously and outputs pixel voltages for the two pixels. The date line selector 123 selects two adjacent TFTs 109 simultaneously and turns two adjacent data lines into an active state, to which a pixel voltage is simultaneously applied. For example, the data line selector 123 first selects the data lines 102 at the first and second columns. The two-stage D/A 122 outputs pixel voltages according to data to be displayed on the pixels at the first and second columns, and the pixel voltages are applied, via the TFTs, to the pixel electrodes at the first and second columns. After elapse of two shift clock periods, the data line selector 123 then selects the data lines at the third and fourth columns and the two-stage D/A 122 outputs pixel voltages for the pixels at the third and fourth columns. Thereafter, voltage application for two pixels is repeated in the similar manner. Thus, by controlling voltage application such that the pixel voltages are simultaneously applied to a plurality of pixel electrodes, a pixel voltage can be continuously applied over a plurality of shift clock periods so as to secure sufficient time for pixel voltage application in spite of the increase in the number of pixels.

Another control method has been also proposed for driving an LCD in such a manner that a display area is divided in the horizontal direction, as shown in FIG. 3B, such that a voltage is applied to a plurality of pixels in parallel. A method for driving an LCD in a manner that a display area is divided into two regions in the horizontal direction will be described, as an example.

FIG. 3A is a block diagram depicting a section of a drive circuit for driving an LCD in such a manner that the display area is divided into two regions in the horizontal direction. The shown circuit comprises a mutiplexer 131, a memory portion 132, and a two-stage D/A 133, and differs from the structure of FIG. 1 in that it is constructed such that a data line selector 135 simultaneously selects two data lines, as shown in FIG. 3B.

An externally applied video signal for one row is input to the multiplexer 131, which then outputs the earlier half of the input video data, being data corresponding to the left half of the screen, to the memory portion 132. The memory portion 132 temporarily stores the earlier data to output it in synchronism with the latter half of the data, being the data corresponding to the right half of the screen, to the two-stage D/A 133. The two-stage D/A 133 outputs pixel voltages V1 and V2 based on the earlier and latter halves of the data, respectively.

The data line selector 135 simultaneously selects two of the data lines 135, to both of which is simultaneously applied a pixel voltage. For example, the data line selector 135 first selects the data line at the first column and the first data line in the right half of the screen, which is the data line 135A at the 401st column in an LCD having 800 pixels in the horizontal direction, for example. The two-stage driver 133 outputs pixel voltages according to data to be displayed in the pixels at the first and 401st columns, and the pixel voltages are applied, via the TFTs, to the pixel electrodes at the respective columns. The data line selector 135 then selects the data lines at the second and 402nd columns and the two-stage driver 133 outputs pixel voltages for the pixels at these columns. Thereafter, voltage application for two pixels is repeated in the similar manner. This control method also enables voltage application to be controlled such that a voltage is simultaneously applied to a plurality of pixel electrodes. Therefore, it is possible to continuously apply a pixel voltage over a plurality of shift clock periods so as to secure sufficient time for pixel voltage application despite an increase in the number of pixels.

Thus, by allotting a video signal among a plurality of phases such that a pixel voltage is simultaneously applied to a plurality of pixels, the time for applying the pixel voltage can be secured even when the number of pixel is increased.

Different control circuits are presently manufactured corresponding to each of the various types of driving methods and display devices having different number of pixels as described above. However, each type of control circuit which thus varies depending on the driving method or the number of pixels can be manufactured only in a small amount. This disadvantageously increases the manufacturing cost of each circuit.

SUMMARY OF THE INVENTION

As described above, an object of the present invention is to provide a signal processing circuit which is used for a circuit for driving a display unit in a display device, such as an LCD, horizontally divided into a plurality of regions, which operates in an efficient manner, and which can be used in a variety of applications.

In order to achieve the above object, the present invention, according to one aspect, provides a signal processing circuit for processing an input digital video signal and producing display data for a display unit divided into a plurality of regions to be driven, comprising a data separation portion for performing assignment of said input digital video data and a plurality of memory portions for storing said digital data assigned by said data separation portion, each of said memory portions including an input-side line memory having a data storage capacity equal to or greater than the number of pixels of said display unit in a horizontal direction divided by the number of said regions and sequentially receiving and storing said digital data, and an output-side line memory for holding the serial data stored in said input-side line memory and transferred in parallel from said input-side line memory and having a plurality of output portions capable of serially outputting the data held therein from prescribed positions different from each other; wherein selection is made among said plurality of output portions of said output-side line memory in accordance with the number of pixels of said display unit in a horizontal direction, and serial output data is supplied from the selected output portion in each of said plurality of memory portions to said display unit as analog display data.

According to another aspect of the present invention, the number of said plurality of memory portions provided in said circuit is determined according to the number of regions into which said display unit is divided in a horizontal direction.

According to still another aspect of the present invention, said plurality of output portions are each uniquely connected to a data output in a predetermined and different stage of said n-stage output side shift register.

According to a further aspect, the present invention provides a signal processing circuit for processing an input digital video signal and producing display data for a display unit divided into a plurality of regions to be driven, comprising a data separation portion for performing assignment of said input digital video data; a plurality of memory portions for storing said digital data assigned by said data separation portion; each of said memory portions including an input-side line memory having a data storage capacity equal to or greater than the number of pixels of said display unit in a horizontal direction divided by the number of said regions and sequentially receiving and storing said digital data, and an output-side line memory for holding the serial data stored in said input-side line memory and transferred in parallel from said input-side line memory and having a plurality of output portions capable of serially outputting the data held therein from prescribed positions different from each other; and an output selector for selecting among said plurality of output portions of said output-side line memory in accordance with the number of pixels of said display unit in a horizontal direction; wherein the serial output data supplied from each of said plurality of memory portions through said output selector is converted into analog data and the converted data is supplied to said display unit as display data by a digital-analog conversion processing portion.

According to a further aspect of the present invention, the data storage capacities of said input-side line memory and of said output-side line memory correspond to 400 pixels or 512 pixels.

According to a still further aspect of the present invention, said plurality of output portions of said output-side line memory can output serial data in a sequential manner starting from the 400th, 320th, and 256th data items counting from the last input data item of said digital data serially input to said input-side line memory.

According to a yet further aspect of the present invention, the number of said plurality of memory portions is equal to the product of the number of regions into which said display unit is divided in a horizontal direction and the number of primary colors displayed at said display unit, and said memory portions respectively receive said digital video signals corresponding to the regions and/or primary colors different from each other.

As described above, according to the present invention, a plurality of output portions are provided in the output-side line memory that can serially output from different positions data held therein. Because selection can be made among the plurality of output portions, output portions suitable for the number of pixels of the display unit in the display device can be selected. Therefore, a single signal processing circuit configuration can be used for display devices with different numbers of pixels to produce display data suitable for the respective display devices.

According to a further aspect of the present invention, said input digital video signal is input every horizontal scanning period, and parallel data transfer from said input-side line memory to said output-side line memory is performed during a horizontal blanking period.

As the horizontal blanking period is provided once at the end (or beginning) of one horizontal scanning period, the blanking period can be used for parallel data transfer, so that the data transfer is completed by the time the next horizontal scanning period is started and the digital video signals for that scanning period is input to the input-side line memory. Consequently, data can be efficiently transferred from the input-side line memory to the output-side line memory.

According to a further aspect of the present invention, said input-side line memory is an n-stage input side shift register for sequentially holding said digital data received at a data input terminal of a first stage, the number n being equal to or greater than the number of pixels of said display unit in a horizontal direction divided by the number of said regions, and said output-side line memory includes an n-stage output side memory having the same number of stages as said input side memory, and an input data switch circuit for switching, as input data for each stage of said n-stage output side memory, output data which can be transferred in parallel from each stage of said n-stage input side memory, and output data shifted from an immediately preceding or succeeding stage of said n-stage output side memory.

According to a further aspect of the present invention, said output-side line memory further includes a shift direction switch circuit for switching a data shift direction in said n-stage output side shift register to an $m-1$ (where $m<n$) stage direction or an $m+1$ stage direction.

According to a still further aspect of the present invention, said plurality of output portions of said output-side line memory at least include the output portion connected to a data output of the first stage of said n-stage output side shift register and the output portion connected to the data output of k stage, where $1<k\leqq n$.

According to a still further aspect of the present invention, in one of said plurality of memory portions, the output portion connected to the data output of said k stage is selected among said plurality of output portions of said output side memory, and data is read out from said output side memory following the order in which data is input to said input side memory, and in the other of said plurality of memory portions, the output portion connected to the data output of said first stage is selected among the plurality of output portions, and data is read out from said output side memory in the reverse order from which data is input to said input side memory.

According to a yet further aspect of the present invention, the data items stored in said plurality of memory portions are the digital video signals corresponding to adjacent regions of said display unit.

According to a further aspect of the present invention, when a mirror image signal is input to said output selector, said output selector selects the output portion connected to the data output of the k stage among the plurality of output portions of said output side memory for said one of said plurality of memory portions, and selects the output portion connected to the data output of the first stage among said plurality of output portions for said other of said plurality of memory portions.

According to a further aspect of the present invention, the numbers n and k are any of 512, 400, 320, and 256.

Thus, according to the present invention, the data shift direction in the output side memory, such as a shift register and any of other memories including an ASIC, an SRAM, and a DRAM, capable of data shift therein, can be switched and controlled by the shift direction switch circuit, and data can be output in the input order or in the order reversed from the input order for any output side line memory by selecting the output portion. For example, for adjacent regions, display data can be supplied in the same order as the input order of the digital video data for one region, while the display data can be supplied in the reversed order for the other region. As a result, the present circuit can be used as a signal processing circuit for a display device having a region for sequentially driving dots in a forward direction and a region for sequentially driving dots in a backward direction, and for a display device employing, when a mirror image signal is supplied, a mirror image display mode in which the serial video signal data for one horizontal scanning period is reversed, as in a mirror image, using the data for the horizontal center of the display unit as the center for the reversion, and written into respective pixels in a horizontal row of the display unit.

BRIEF DESCRIPTION OF THE DRAWINGS

These and other objects of the invention will be explained in the description below, in connection with the accompanying drawings, in which.

DETAILED DESCRIPTION OF THE PREFERRED EMBODIMENT

Preferred embodiments of the present invention will be described in further detail with reference to the accompanying drawings.

Figure 1:
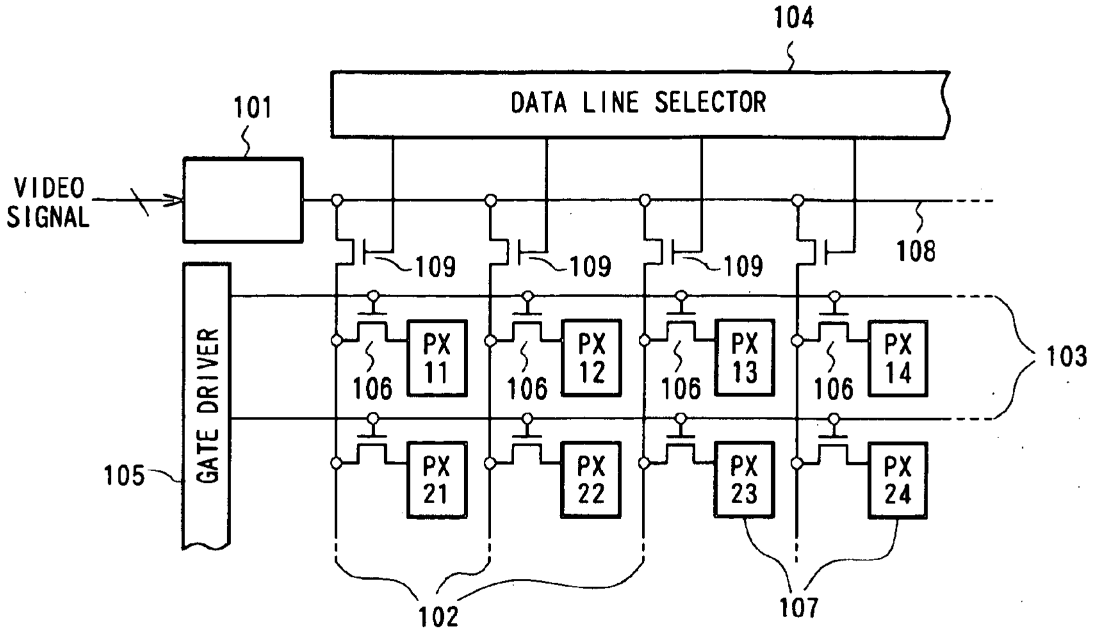
Fig. 1 PRIOR ART
FIG. 1 is a diagram which conceptually depicts an overall structure of a conventional active matrix LCD.
Figure 2:
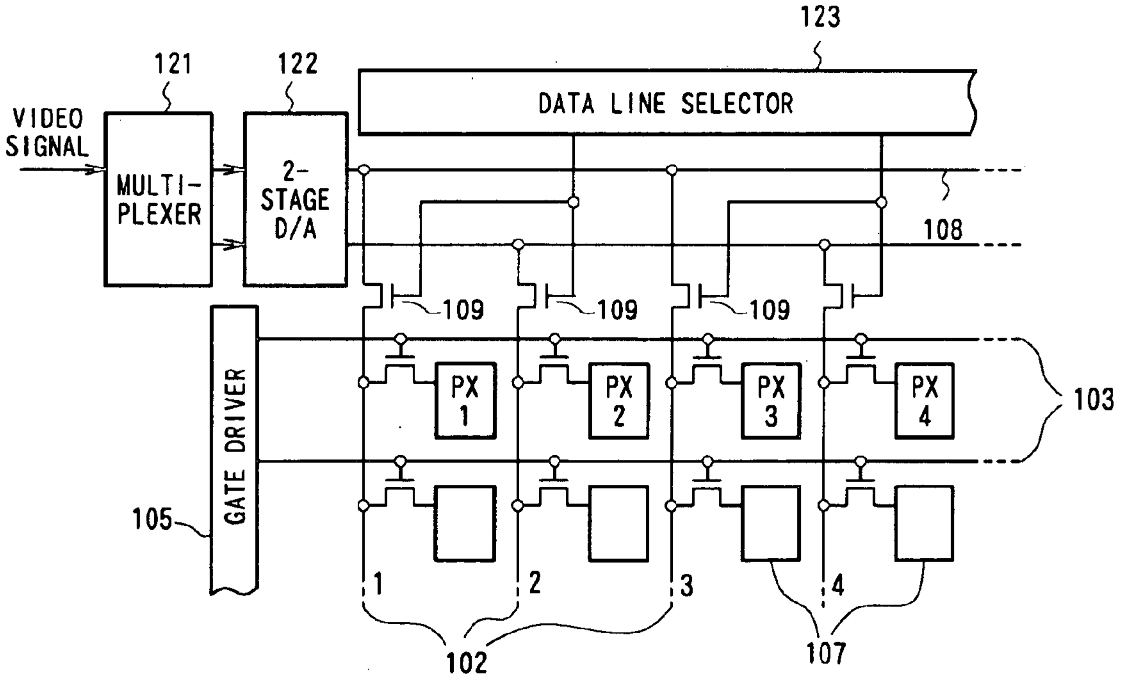
Fig. 2 PRIOR ART
FIG. 2 is a diagram which conceptually depicts an overall structure of a conventional two-phase display type LCD.
Figure 3A:
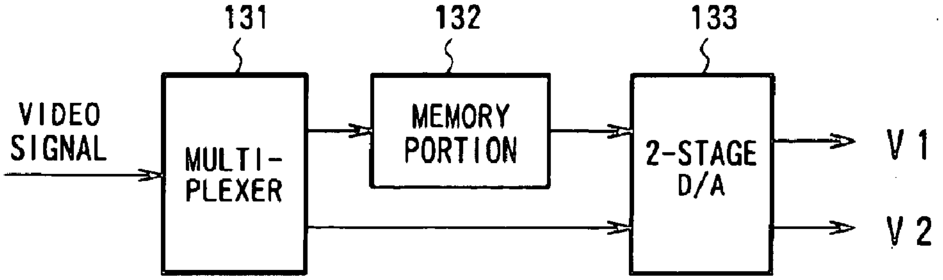
Fig. 3A PRIOR ART
FIG. 3A is a diagram showing part of the structure of a conventional drive circuit for achieving display in an LCD divided into horizontal two regions.
Figure 3B:
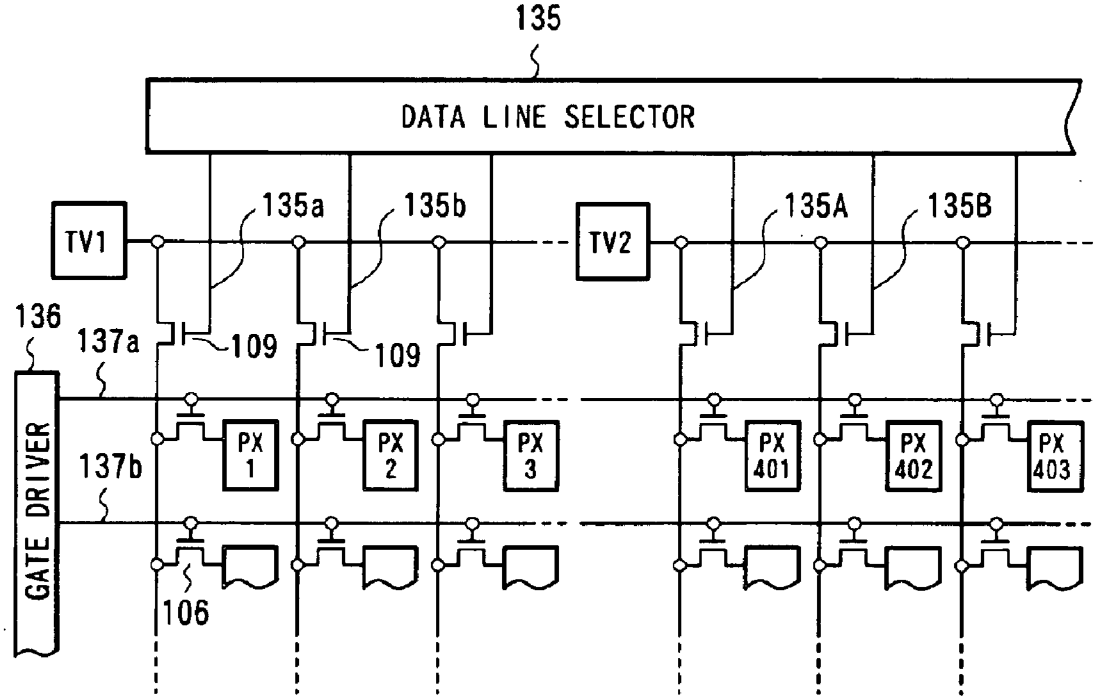
Fig. 3B PRIOR ART
FIG. 3B is a diagram showing the structure of an LCD divided into two horizontal regions.
Figure 4:
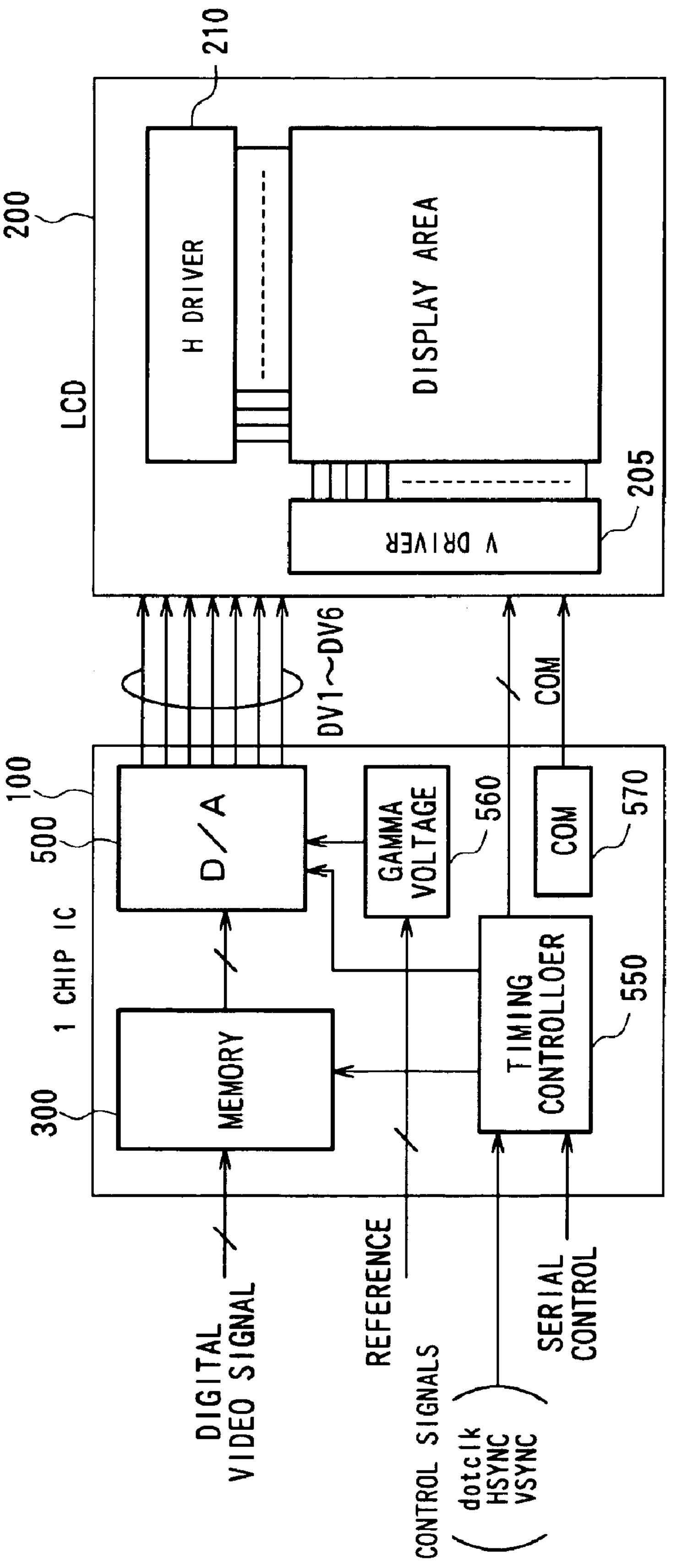
FIG. 4 is a diagram for explaining an overall structure of a liquid crystal display device according to the present invention.

FIG. 4 depicts an example of a whole structure of a liquid crystal display comprising an LCD drive IC (a signal processing IC) 100 and an LCD panel 200 according to the present invention.

The LCD panel 200 in this example is an active matrix panel in which each pixel in the display area comprises a thin film transistor (TFT) as a switching element. The display area is formed on a substrate made of glass or the like. In the peripheral portion of the display area on the substrate, there are formed a gate driver (V driver) 205 for actuating the TFT of each pixel in the display area and a data line driver (H driver) 210 for supplying display data to a selected data line. These drivers 205, 210 are not limited to the built-in driver type in which drivers are formed on the substrate on which the display area is also formed in the peripheral portion of the display area, but may be formed within an LCD drive IC 100 which will be described below, or may be a discrete IC.

The LCD drive IC 100 comprises a memory 300, a digital to analog converter (D/A), a timing controller 550, a γ correction voltage generator 560, a common electrode voltage generator 570, and the like.

The memory 300 temporarily stores each RGB digital video signal, applied, for example, externally, to then output the signal as serial data at appropriate timing. The D/A 500 converts the serial digital signal supplied from the memory 300 into an analog signal, and also applies necessary treatments such as γ correction, brightness adjustment, and voltage amplification to the display data according to the display characteristics in the LCD panel 200, before supplying the processed display data to the H driver 210 of the panel 200. The timing controller 550 generates a timing control signal which is necessary in the V driver 205 and the H driver 210 based on an externally applied dot clock dotclk, horizontal synchronization signal HSYNC, vertical synchronization signal VSYNC, or the like, and also controls the operation of the memory 300 and the D/A 500.

The LCD according to this embodiment adapts a driving method for driving an LCD panel 200 such that the display area is divided into a plurality of regions in the horizontal direction, for example, into the right half region and the left half region, as in the related art example. According to the first embodiment, however, the same IC 100 can be commonly used for LCD panels 200 having different number of pixels so as to drive the LCDs divided into regions, which is different from the related art.

Figure 5:
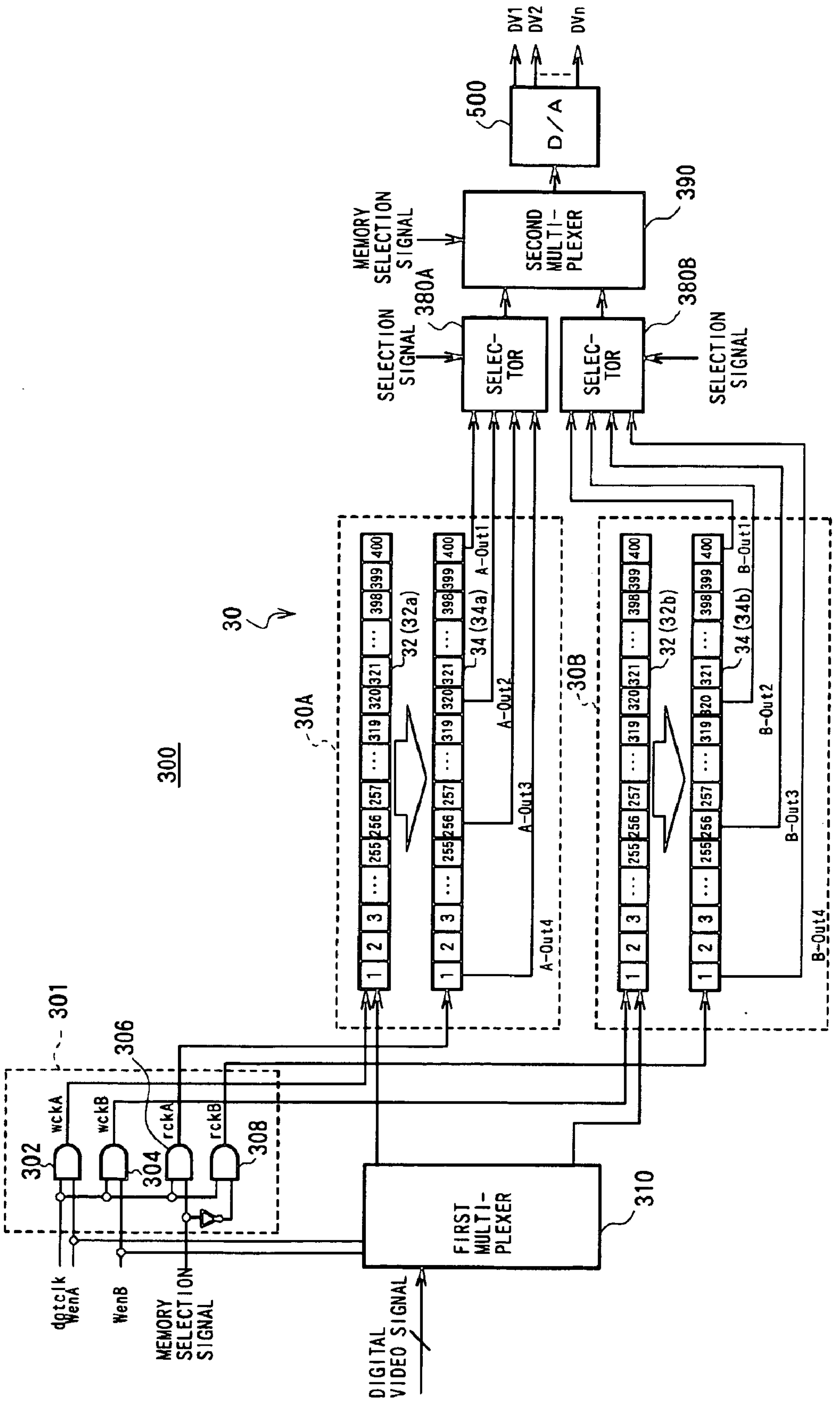
FIG. 5 is a diagram for explaining the structure of a memory 300 of FIG. 4.

Such flexibility of the LCD drive IC 100 relies on the structure of the signal processing circuit for generating, from an input video signal, display data to be supplied to the display area, in particular on the structure of the memory 300, which is shown in FIG. 5. As shown in FIG. 5, the memory 300 comprises a first multiplexer 310, a memory portion 30 which actually stores data, a memory switch circuit 301, output selectors 380A and 380B, and a second multiplexer 390.

The memory portion 30 is composed of two memory portions of the same structure, namely first and second memory portions 30A and 30B, each having an input-side line memory 32 (32*a*, 32*b*) and an output-side line memory 34 (34*a*, 34*b*). The input-side line memory 32 captures and holds a digital video signal supplied as serial data from the first multiplexer 310 in the order in which it was supplied. The output-side line memory 34 captures and holds the data supplied in parallel from the input-side line memory 32 and outputs the display data as serial data from any one of output portions (terminals) Out1~Out4 provided at a plurality of predetermined addresses. In this embodiment, the input side and output-side line memories 32, 34 are both capable of storing a video signal corresponding to the maximum of 400 pixels.

The first multiplexer 310 supplies an input digital video signal to either the first or second memory portion 30A, 30B according to a write enable signal WenA, WenB. When the display area is divided into right and left regions as in the present embodiment, such writing operation to the first memory portion 30A and the second memory portion 30B is switched between the former (earlier) half and the latter half of one horizontal scanning period.

The selector 380A selects any of the plurality of output terminals A-Out1-A-Out4 of the output-side line memory 34*a* based on an output selection signal, and supplies the data serially output from the selected output terminal to the second multiplexer 390. Similarly, the selector 380B selects any of the plurality of output terminals B-Out1-B-Out4 of the output-side line memory 34*b* based on an output selection signal, and supplies data serially output from the selected output terminal to the second multiplexer 390. The second multiplexer 390 selects, based on a memory selection signal, either the output from the first memory portion 30A or the output from the second memory portion 30B supplied via the selectors 380A and 380B, respectively, and supplies the selected data to the D/A 500 provided downstream of the memory 300.

Figure 6A:
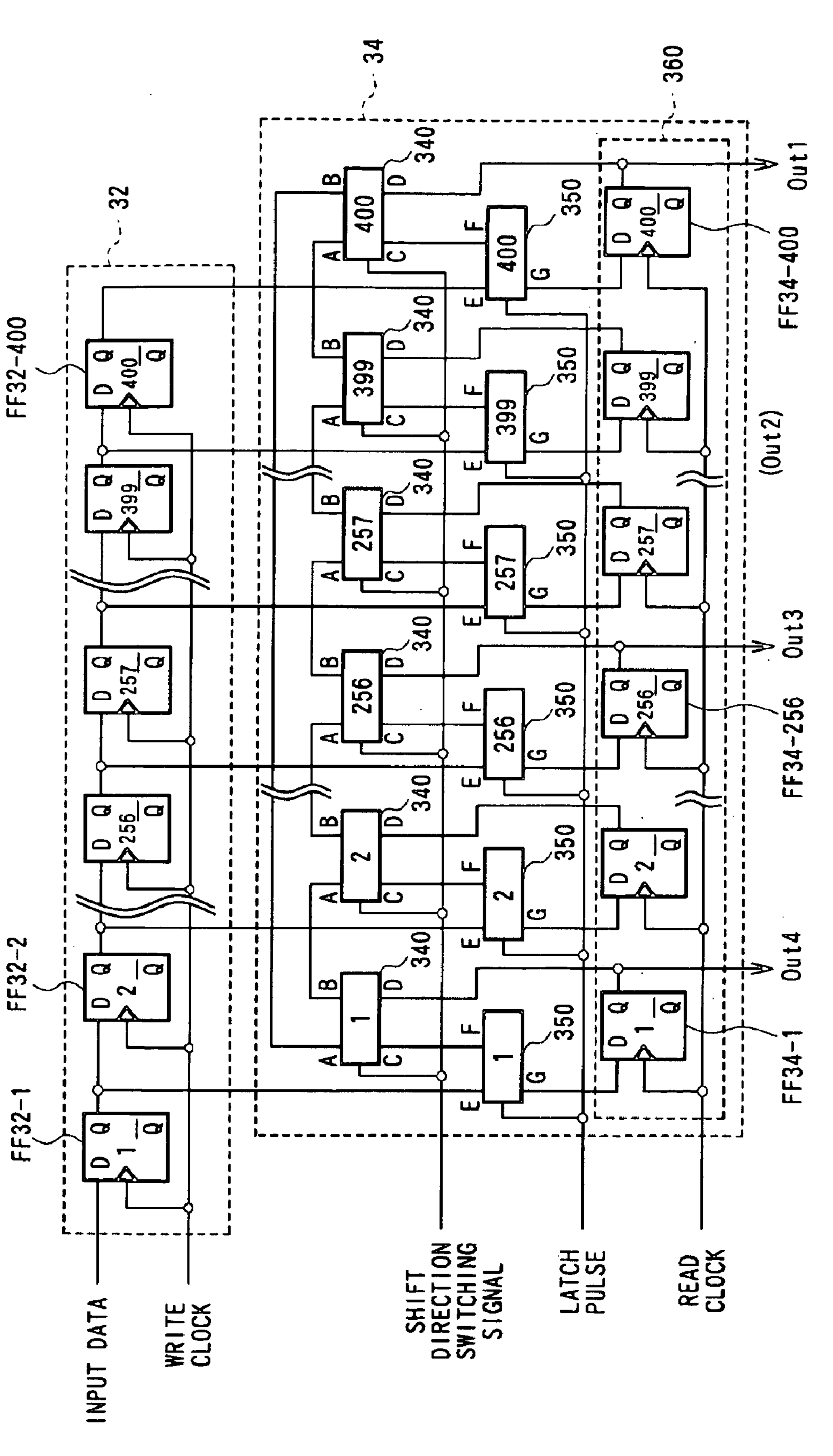
FIG. 6A is a diagram depicting a more specific structure of first and second memory portions 30A and 30B of FIG. 5.

The structure of the first and the second memory portions 30A and 30B will be described in more detail, with reference to FIG. 6A. Referring to FIG. 6A, the input-side line memory 32, which, in this example, is composed of an input side shift register comprising a 400-stage flip flop (FF) 32 (n=400), latches a serial video signal sequentially supplied from the first multiplexer 310 and shifts the latched video signal one by one to the adjacent FFS to the right of the drawing. (FF321-1>FF32-2→ . . . FF32-400).

The output-side line memory 34 comprises an output side shift register 360 which is composed of a 400-stage FF34 (FF34-1 to FF34-400) similar to that in the input-side line memory 32, a shift direction switching circuit 340 for controlling the data shift direction in the shift register 360, and an input data switching circuit 350 for switching the data to be supplied to the D terminal of each FF34. The Q terminals of the k-th stage FF34, more specifically, the 400th FF (FF34-400), the 320th FF (FF34-320, not shown in FIG. 6A), the 256th FF (FF34-256), and the first FF (FF34-1), when counted from the FF at left end, are connected to memory output terminals Out1 to Out4, respectively.

Figure 6B:
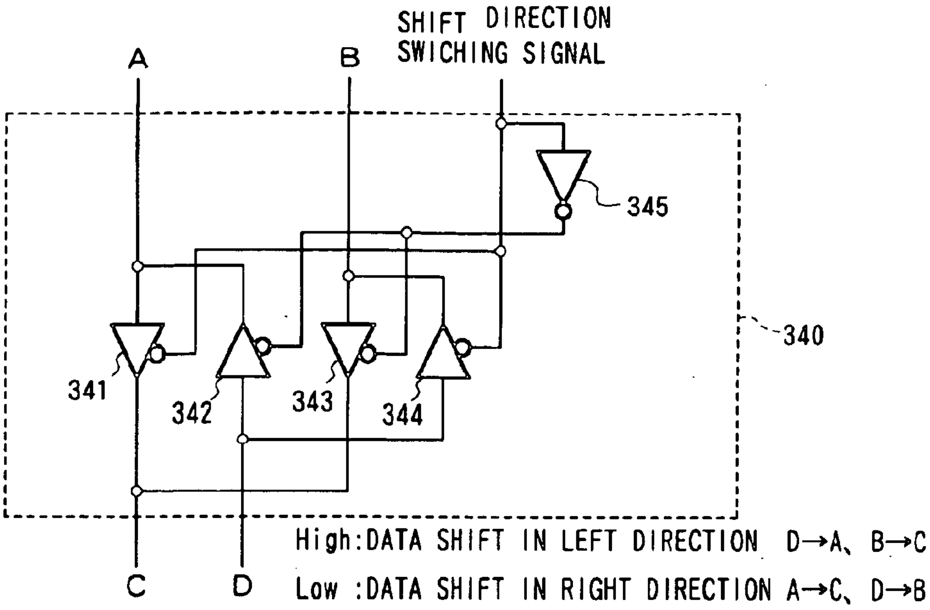
FIG. 6B is a diagram depicting the structure of a shift direction switching circuit 340 of FIG. 6A.

The shift direction switching circuit 340, which is a circuit for switching the data shift direction in the shift register 360 as already described, is provided so as to correspond to each of the 400 stages of FFs34. FIG. 6B depicts an example of the structure of each switching circuit 340 which comprises an inverter 345 and a plurality of gates 341~344 for enabling signal transmission in one direction.

When a shift direction switch signal is at an H level, the gates 342 and 343 are opened by an inversion signal, which is a switch signal inverted by the inverter 345, while the gates 341 and 344 are closed by supply of a non-inverted switch signal, such that signal transmission in the direction from D to A and in the direction from B to C is enabled. On the other hand, when the shift direction switch signal is at an L level, the gates 342 and 343 are closed while the gates 341 and 344 are opened, such that signal transmission in the direction from A to C and in the direction from D to B is enabled.

Referring back to FIG. 6A, an input/output Am of the m-th ($1 \leqq m < n$) shift direction switching circuit 340 is connected to an input/output Bm−1 of the (m−1)th shift direction switch circuit 340 while an input/output Bm is connected to an input/output Am+1 of the (m+1)th shift direction switching circuit 340. An input/output A of the first shift direction switch circuit 340 is connected to an input/output B of the 400(n)th shift direction switch circuit 340. Accordingly, when a shift direction switch signal is at an H level, a Q output from the (m+1)th FF34 is transmitted through D to A of the (m+1)th shift direction switching circuit 340 to the m-th shift direction switching circuit 340 through B to C, which is further transmitted from F to G of the m-th input data switching circuit 350 to be then supplied to the D terminal of the m-th FF 34. As a result, data shift in the left direction in FIG. 6A is carried out in the shift register 360.

To the contrary, when a shift direction switch signal is at an L level, a Q output from the m-th FF34 is transmitted through D to B of the m-th shift direction switch circuit 340 to the (m+1)th shift direction switch circuit 340 through A to C, which is further transmitted from F to G of the (m+1)th input data switch circuit 350 to be then supplied to the D terminal of the (m+1)th FF 34. In this case, data shift in the right direction in FIG. 6A is carried out in the shift register 360.

Figure 6C:
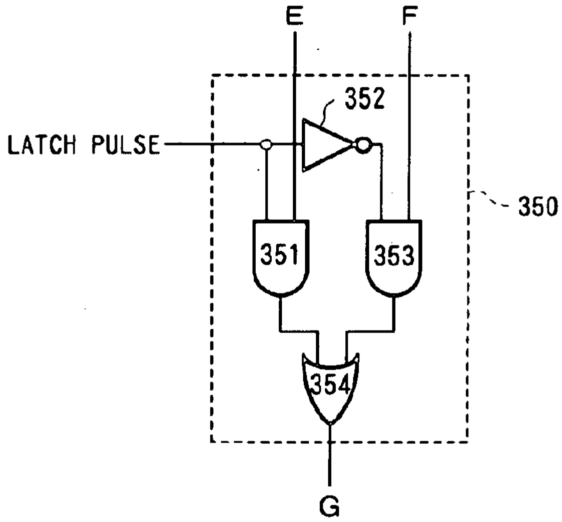
FIG. 6C is a diagram depicting the structure of an input data switching circuit 350 of FIG. 6A.

The input data switching circuit 350 comprises AND gates 351 and 353, an OR gate 354 which obtains a logical sum, and an inverter 352, as shown in FIG. 6C. Referring back to FIG. 6A, the input data switching circuit 350 is provided corresponding to each of the 400 stage FFs34 constituting the shift register 360. An input E of the m-th input data switch circuit 350 is connected to the Q terminal of the corresponding m-th FF32 of the input-side line memory 32, while an input F is connected to the output C of the corresponding m-th shift direction switch circuit 340. An output G is connected to the D terminal of the corresponding m-th FF34.

Accordingly, when an H level latch pulse is supplied to the input data switching circuit 350, the input E is selected of the inputs E and F, such that the Q output of the m-th FF32 of the input-side line memory 32 is supplied to the D terminal of the corresponding m-th FF34 of the output-side line memory 34. Namely, data is transmitted in parallel from the input-side line memory 32 to the output-side line memory 34 and is written into the output-side line memory 34.

Figure 6D:
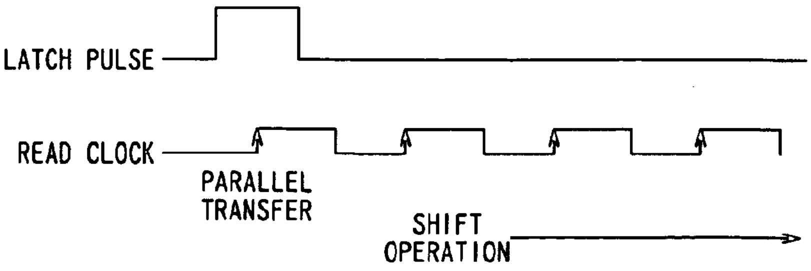
FIG. 6D is a timing chart for explaining the data shift operation of the output-side line memory shown in FIG. 6A.

During the L level period of a latch pulse, on the other hand, the input F is selected, such that the Q output of the m−1th or m+1th FF34 supplied via C of the m-th shift direction switch circuit 340 is transmitted to the D terminal of the FF34. Accordingly, each time a read clock supplied to the CK terminal of each FF34 rises, data shift operation in the right or left direction is carried out in the shift register 360 of the output-side line memory 34, as shown in FIG. 6D.

The operation of the complete memory 300 shown in FIG. 5, when, for example, driving an SVGA panel having 800 pixels in the horizontal direction, will be now described with reference to FIG. 7. Write enable signals WenA (FIG. 7(*c*)) and WenB (FIG. 7(*d*)) are supplied to the first multiplexer 310 which outputs a digital video signal to the corresponding memory portion during the H level period of each signal.

In this embodiment in which the LCD display area is divided into two regions, namely, the left region and the right region, a write enable signal WenA becomes an H level during the former half (the display period for the left region of the display area) of one horizontal scanning (1H) period, when a video signal is supplied to the input-side line memory (shift register) 32 of the first memory portion 30A.

As shown in FIG. 6A, the input-side line memory 32 in each memory portion comprises 400 stages of FFs32, to each of which a write clock wcka or wckB is supplied from an AND gate 302 or 304 as an operation clock.

Figure 7:
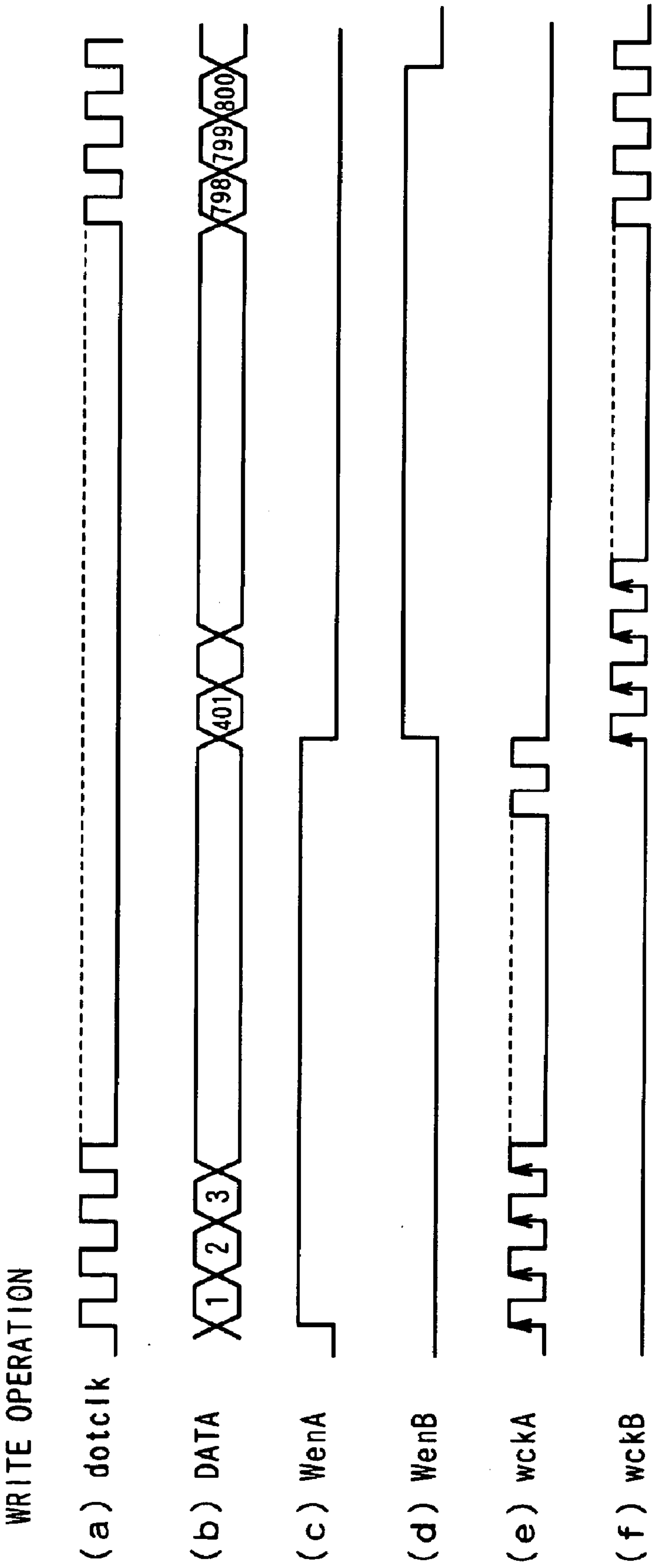
FIG. 7 is a timing chart for explaining the data writing operation to the memory 300 of FIG. 5.

During the H level of the write enable signal WenA, the AND gate 302 outputs a dot clock dotclk as a write clock wckA, as shown in FIG. 7(*e*), which is then supplied to the CK terminal of each FF32 of the first memory portion 30A. The first stage FF32-1 of the input line memory (shift register) 32*a* captures a video signal supplied to the D terminal from the first multiplexer 310 at each rise of a write clock wckA. The second stage FF32-2 captures a Q output of the FF32-1 in response to the rise of the same write clock wckA. In this manner, the data captured by the FF32-1 is sequentially transferred to the adjacent FF32 in the right direction each time the write clock wcka rises, so that after elapse of 400 dot clock periods, the FF32-1 to FF32-400 hold the corresponding 400th to first video signal, respectively.

After elapse of 400 dot clock periods from the beginning of 1H period, the latter half of the 1H period (the display period for the right region of the display area) starts, when the write enable signal WenA becomes an L level whereas the write enable signal WenB becomes an H level. A video signal from the first multiplexer 310 is then output to the second memory portion 30B and the write clock wckA is fixed at the L level so that the data shift operation in the input-side line memory 32 of the first memory portion 30A is interrupted.

During the H level of the write enable signal WenB, a write clock wckB is supplied from the AND gate 304 to the second memory portion 30B. As in the above-mentioned case of the first memory portion 30A, each time the write clock WenB rises, the first stage FF32-1 of the input line memory (shift register) 32*b* sequentially captures a video signal starting from the 401st video signal, which is supplied from the first multiplexer 310, and the data captured by the FF32-1 is sequentially transferred to the adjacent FF32 in the right direction, so that 800 dot clock periods from the beginning of the 1H period, the FF32-1 to FF32-400 of the second memory portion 30B hold the corresponding 800th to 401st video signals, respectively.

Once data is held in all of the FFs32 of the input line memories 32*a*, 32*b* in the first and second memory portions 30A and 30B, and an H level latch pulse is supplied to the input data switch circuit 350 in each of the memory portions 30A and 30B, each of the Q terminals of the FF32-1 to FF32-400 of the input-side line memory 32 is connected, via the corresponding input data switch circuit 350, to the D terminal of the corresponding FF34-1 to FF34-400 of the output-side line memories 34*a* and 34*b*. When a read clock supplied to the shifter register 360 rises, all of the FF34-1 to FF34-400 in the output-side line memories 34*a* and 34*b* capture the Q output of the corresponding FF32-1 to FF32-400 simultaneously. Thus, parallel data transfer from the input-side line memory 32 to the output-side line memory 34 is performed in the first and second memory portions 30A and 30B at the same time during the horizontal blanking period provided once in each 1H period.

During the following 1H period, as in the previous 1H period, a video signal is written into the input-side line memory 32*a* of the first memory portion 30A during the former half of the 1H and a video signal is written into the input-side line memory 32*b* of the second memory portion 30B during the latter half of the 1H period, and then parallel data transfer to the output-side line memories 34*a* and 34*b* is performed during the horizontal blanking period. Subsequently, the similar operation will be repeated in this manner.

Figure 8:
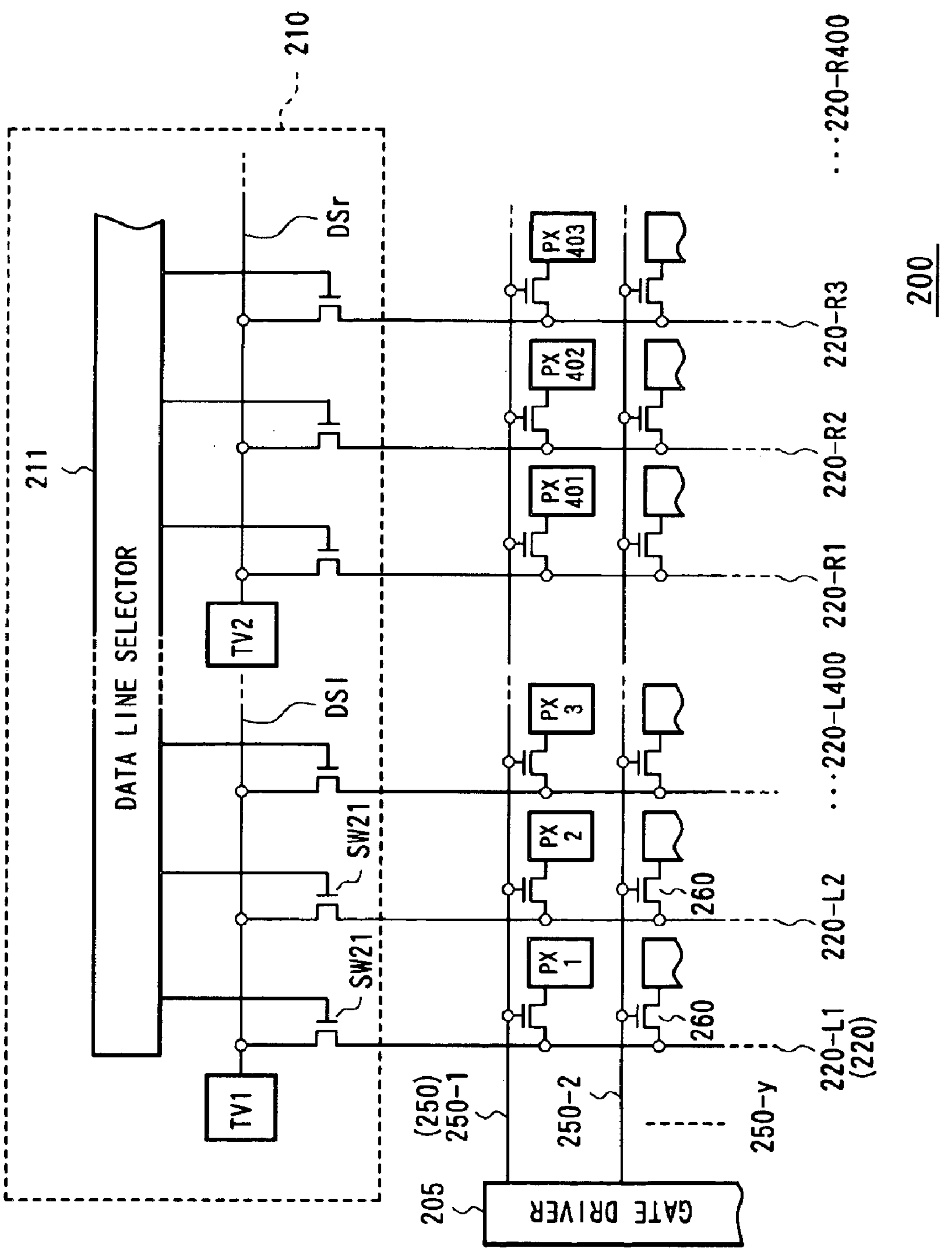
FIG. 8 is a diagram depicting the structure of an LCD panel according to a first embodiment of the present invention.
Figure 9:
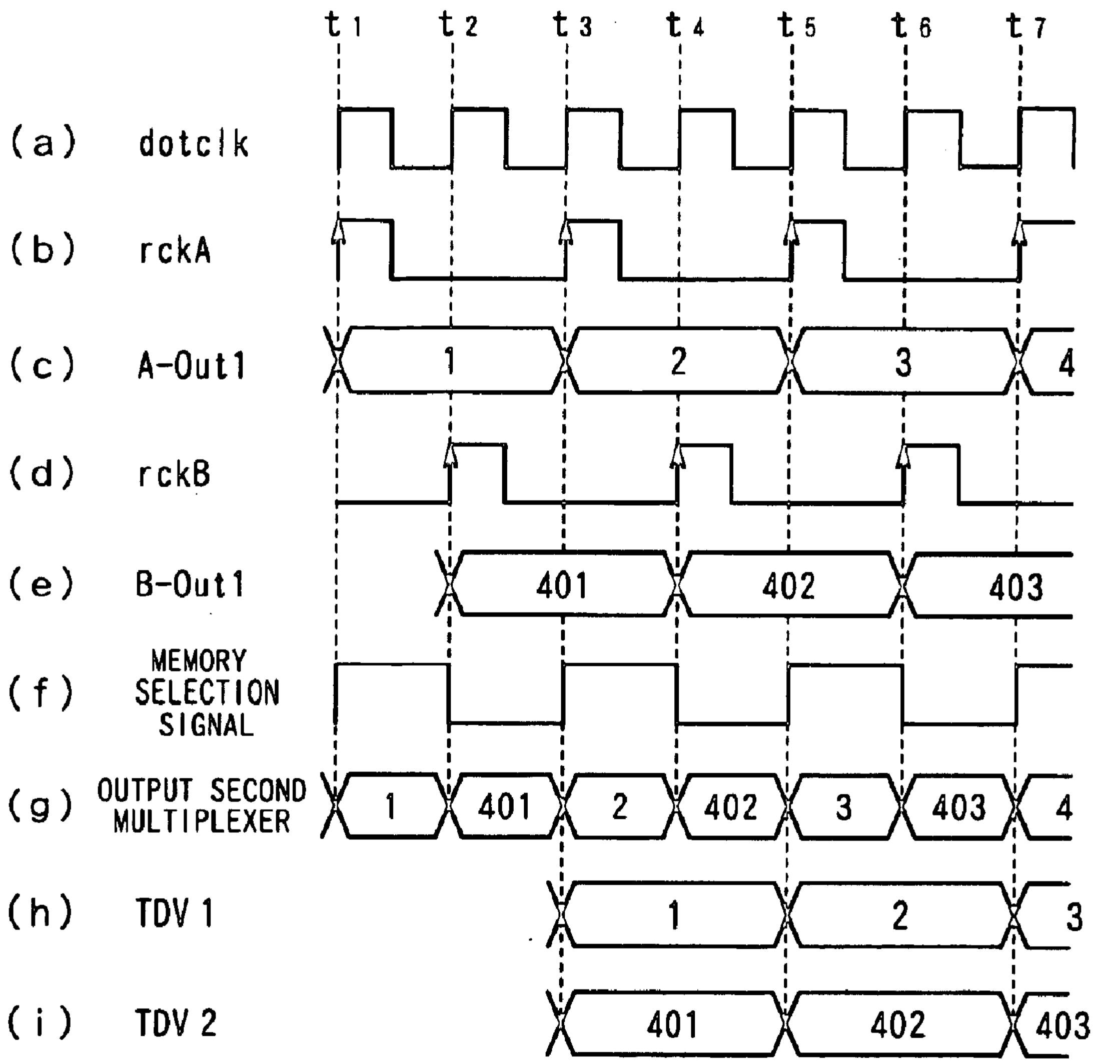
FIG. 9 is a timing chart for explaining the data reading operation of a circuit of the first embodiment with regard to the panel shown in FIG. 8.

The process of data output (data read out) from the output-side line memories 34*a* and 34*b* and the process of display data output to the LCD panel 200 will be described with reference to FIGS. 8 and 9. FIG. 8 depicts an example of the structure of an LCD panel 200 divided into two horizontal regions and driven in a two-phase manner by the LCD drive IC 100 according to this embodiment. FIG. 9 is a timing chart showing the process of supplying display data to the panel 200 of FIG. 8.

In this example, since the display area of the LCD panel 200 of FIG. 8 has 800 pixels in the horizontal direction, the selectors 380A and 380B select Out1 (A-Out1, B-Out1) connected to the Q terminals of the 400th FFs34 of the output-side line memories 34*a* and 34*b*, respectively, based on the respective selection signals. Further, the input data switching circuits 350 select the input F while the shift direction switching circuits 340 are in a mode in which data shift in the right direction are performed.

The level of a memory selection signal changes between an H level and an L level each dot clock period, as shown in FIG. 9(*f*). The AND gate 306 in FIG. 5, which obtains a logical product of this memory selection signal and a dot clock dotclk (FIG. 9(*a*)), supplies a dot clock dotclk to the output-side line memory 34*a* of the first memory portion 30A as a read clock rcka (FIG. 9(*b*)) when the memory selection signal is at an H level, namely for every two dot clock periods. On the other hand, the AND gate 308 in FIG. 5, which obtains a logical product of an inversion signal of the memory selection signal and a dot clock dotclk, supplies a dot clock dotclk to the output-side line memory 34*b* of the second memory portion 30B as a read clock rckB (FIG. 9(*d*)) when the memory selection signal is at an L level, namely for every two dot clock periods, at a timing which is shift from the rise of the read clock rckA by one dot clock.

The shift register 360 of the output-side line memory 34*a* of the first memory portion 30A, which receives the above-mentioned read clock rckA shown in FIG. 9(*b*) at the CK terminal, transfers the data held in each FF34 to the adjacent FF in the right direction each time the clock rckA rises. Accordingly, as shown in FIG. 9(*c*), the A-Out1 connected to the Q terminal of the 400th FF34 outputs the display data including the data corresponding to the first (counted from the left end) to the 400th pixels in the display area, serially to the second multiplexer 390.

On the other hand, a read clock rckB which rises at a timing shifted from the clock rckA by one dot clock period is supplied to the CK terminal of the shift register 360 of the second memory portion 30B, and the data held in each FF 34 is transferred to the adjacent FF34 in the right direction each time the clock rckB rises. Accordingly, as shown in FIG. 9(*e*), the B-Out1 of the output-side line memory 34*b* outputs the display data including from the data corresponding to the 401st to the 800th pixels, serially in this order to the second multiplexer 390 at the timing which is shifted from the timing for display data output from the A-Out1, by one dot clock period.

A memory selection signal as shown in FIG. 9(*f*) is supplied to the second multiplexer 390. When the memory selection signal is at an H level, the second multiplexer 390 selects the output A-Out1 from the first memory portion 30A to supply the output to the D/A 500. When the memory selection signal is at an L level, the second multiplexer 390 selects the output B-Out1 from the second memory portion 30B to supply the output to the D/A 500. Thus, the data for the pixel in the left region and the data for the pixel in the right region is supplied to the D/A 500 alternately in this order and sequentially from the data corresponding to the left end pixel in each region (namely, the 1st, 401st, →2nd, 402nd→ . . . →400th, 800th), as shown in FIG. 9(*g*).

The D/A 500 sequentially holds the left region digital data corresponding to one pixel and right region digital data corresponding to one pixel, which are successively supplied from the second multiplexer 390. More specifically, the D/A 500 sequentially holds the digital data corresponding to every two pixels to apply various treatments to the digital data such as γ correction based on a correction voltage from they voltage generator 560, brightness adjustment, and level shift treatment before converting the digital data into analog voltage data (DV1, DV2) according to the digital value. The D/A 500 then outputs the analog data based on the data from the A-Out1 to the Tv1 terminal of the data line driver 210 shown in FIG. 8 and outputs the analog data based on the data from the B-Out1 to the TV2 terminal. Referring to FIG. 8, a data supply line DS1 is connected to the TV1 terminal. The data supply line DS1 is also connected, via each switch SW21, to each of the data lines 220-L1-220-L400 provided in the left half of the display area of the LCD panel 200. Similarly, a data supply line DSr is connected to the TV2 terminal. The data supply line DSr is connected, via each switch SW21, to each of the data lines 220-R1-220-R400 provided in the right half of the display area of the LCD panel 200.

Referring to FIG. 9, for example, the first and 401st display data output from the second multiplexer 390 during the period indicated by t1–t3 is converted by the D/A 500 into the corresponding analog data DV1 and DV2, respectively. Data DV1 and DV2 is then supplied to the respective TV1 and TV2 terminals during the two dot clock periods of the timing t3~t5. The data corresponding to the second and 402nd pixels output from the second multiplexer 390 during the period of the timing t3~t5 is converted into the corresponding analog data while the aforementioned first and 401st data is being output to the TV1 and TV2 terminals, respectively, and is also output to the TV1 and TV2 terminals, respectively, during the following period of the timing t5–t7.

In the LCD panel 200 shown in FIG. 8, the display area has 800 data lines 220 disposed in parallel to extend in the vertical direction for supplying display data to be displayed to each pixel. Further, the gate lines 250 are provided to extend in the horizontal direction so as to intersect with each data line 220, for controlling the on-off operation of the TFT 260 in each pixel connected to the gate line.

A data line driver 210 comprises 800 switches SW21, each uniquely connected to a data line 220, and a data line selector 211 for controlling the on-off operation of the switch SW21 to select the data line at predetermined timing. The data line selector 211 controls, in parallel, the switches SW21 which control the connection between the data lines 220-L1~L400 and the data supply lines DS1 provided in the left half of the display area and the switches SW21 which control the connection between the data lines 220-R1~R400 and the data supply lines DSr provided in the right half of the display area. More specifically, of the plurality of switches SW21, the data line selector 211 selects a total of two switches SW21, namely one SW21 for each of the right and left regions of the display area, at the same time. As a result, a total of two data lines, specifically any one of the data lines 220-R1~L400 in the left region of the display area and any one of the data lines 220-R1~R400 in the right region, are selected at the same time, such that the data DV1 supplied to the TV1 terminal at the time of said data line selection is supplied to the selected one of the data lines 220-L1~L400 and the data DV2 supplied to the TV2 terminal is supplied to the selected one of the data lines 220-R1~R400.

The gate driver 205 selects one of the plurality of gate lines 250(1~γ) during each 1H period, and applies a gate voltage to the selected gate line 250. Assume that the gate line 250-1 and the data lines 220-L1 (at the first column) and 220-R1 (at the 401st column) are selected by the gate driver 205 and the data line driver 210, respectively, for example. In this case, the data DV1 output to the TV1 terminal and the data DV2 output to the TV2 terminal are the data corresponding to the first pixel and the data corresponding to the 401st pixel, respectively, which was output from the 400th stage FF34 first in each of the output-side line memories 34*a* and 34*b*. The data DV1 and DV2 is supplied to the selected data lines 220-L1 and 220-R1, respectively, and the data DV1 is then applied to the pixel electrode PX1 via the TFT 260 which is controlled to be in a on-state while the data DV2 is similarly applied to the pixel electrode PX401 via the TFT 260 which is controlled to be in a on-state.

As already described with reference to FIG. 9, during the following two dot clock periods after elapse of the previous two dot clock periods, the D/A 500 output the data corresponding to the second pixel, which is DV1, to the TV1 terminal and the data corresponding to the 402nd pixel, which is Dv2, to the TV2 terminal. At this time, the gate driver 205 maintains selection of the gate line 250-1, whereas the data line selector 211 selects the data lines 220-L2 (at the second column) and 220-R2 (at the 402nd column) which are next to the data lines 220-L1 and 220-R1 in the right direction, respectively. Thus, the DV1 is applied to the pixel electrode PX2 and the DV2 is applied to the pixel electrode PX402.

In this manner, in each of the left and right regions, the data lines are selected one by one to the right direction for every two dot clock periods. In other words, after selection of the data lines 220-L3 (at the third column) and 220-R3 (at the 403rd column), the data lines 220-L4 and 200-R4 (at the fourth and the 404th columns) will be selected. At the same time, the corresponding data DV1 and DV2 is output to the data supply lines DS1 and DSr. When the data lines 220-L400 and 220-R400 (at the 400th and 800th columns) are selected and a display data voltage is applied to each of the corresponding pixel electrodes PX400 and PX800, the writing operation of a display voltage to each of the pixels provided at the first row in the display area is completed. Then, when a horizontal synchronization signal is output, the gate driver selects the gate line at the second row 250-2. During the period when the gate line at the second row 250-2 is selected, the data lines 220-L1,R1~220-L400, R400 are sequentially selected so as to supply the data Dv1 and DV2 accordingly. When such an operation is repeated for each gate line until the operation for the last gate line 250-*y* of the display area is performed, the writing operation of the display data corresponding to one screen is completed.

The above-described memory 300 of FIG. 4 comprises the first and second memory portions 30A and 30B, which temporarily hold video data supplied as serial digital data in a manner that data corresponding to the left and right regions of the display area are allotted between the memory portions 30A and 30B. The data is then read out from these two memory portions 30A and 30B substantially at the same time, so that writing of the display data can be carried out in parallel for the left and right display regions. Further, each of the first and second memory portions 30A and 30B comprises the input-side line memory 32 for serial input and the output-side line memory 34 for serially outputting the stored data, and the data transfer from the input-side line memory 32 to the output-side line memory 34 is performed in parallel. Accordingly, the process delay in the data transfer can be minimized.

Figure 10:
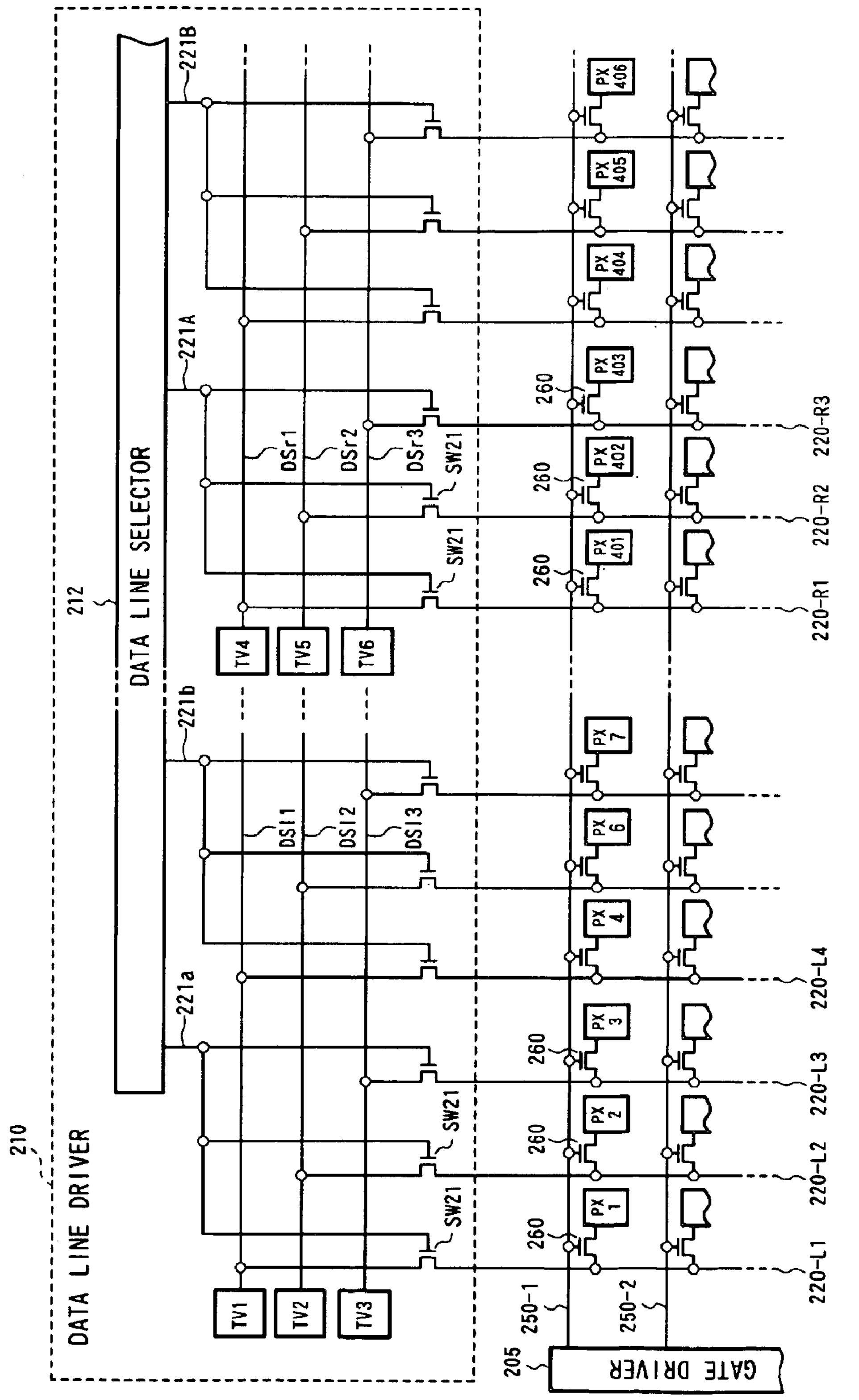
FIG. 10 is a diagram depicting the structure of an LCD panel to be driven in two-region three-phase dividing manner according to a second embodiment of the present invention.

An LCD according to the second embodiment of the present invention will next be described. The second embodiment is similar to the first embodiment in that the memory 300 having the same structure as that of the first embodiment is used to drive an SVGA panel having 800 pixels in the horizontal direction which is divided into two regions in the horizontal direction, but differs from the first embodiment in that it adopts the two-region three-phase dividing (totally six-phase dividing) method for driving the divided regions based on three different phases. FIG. 10 depicts the structure of the LCD panel 200 driven by such two-region three-phase dividing method and FIG. 11 depicts the process of data output from the output-side line memory 34.

A digital video signal externally supplied is serially input via the first multiplexer 310 to each of the input-side line memory 32*a* and 32*b* of the first and second memory portions 30A and 30B. Namely, the data corresponding to the former half of 1H period (left region of the display area) is input to the input-side line memory 32*a* and the data corresponding to the latter half of 1H period (right region of the display area) is input to the input-side line memory 32*b*. After all data corresponding to 1H has been written into all of the FFs32 in the input-side line memories 32*a* and 32*b*, the written data is transferred in parallel to the corresponding FF34*s* of the output-side line memories 34*a* and 34*b*. The process up to this point is the same as that in the first embodiment.

Figure 11:
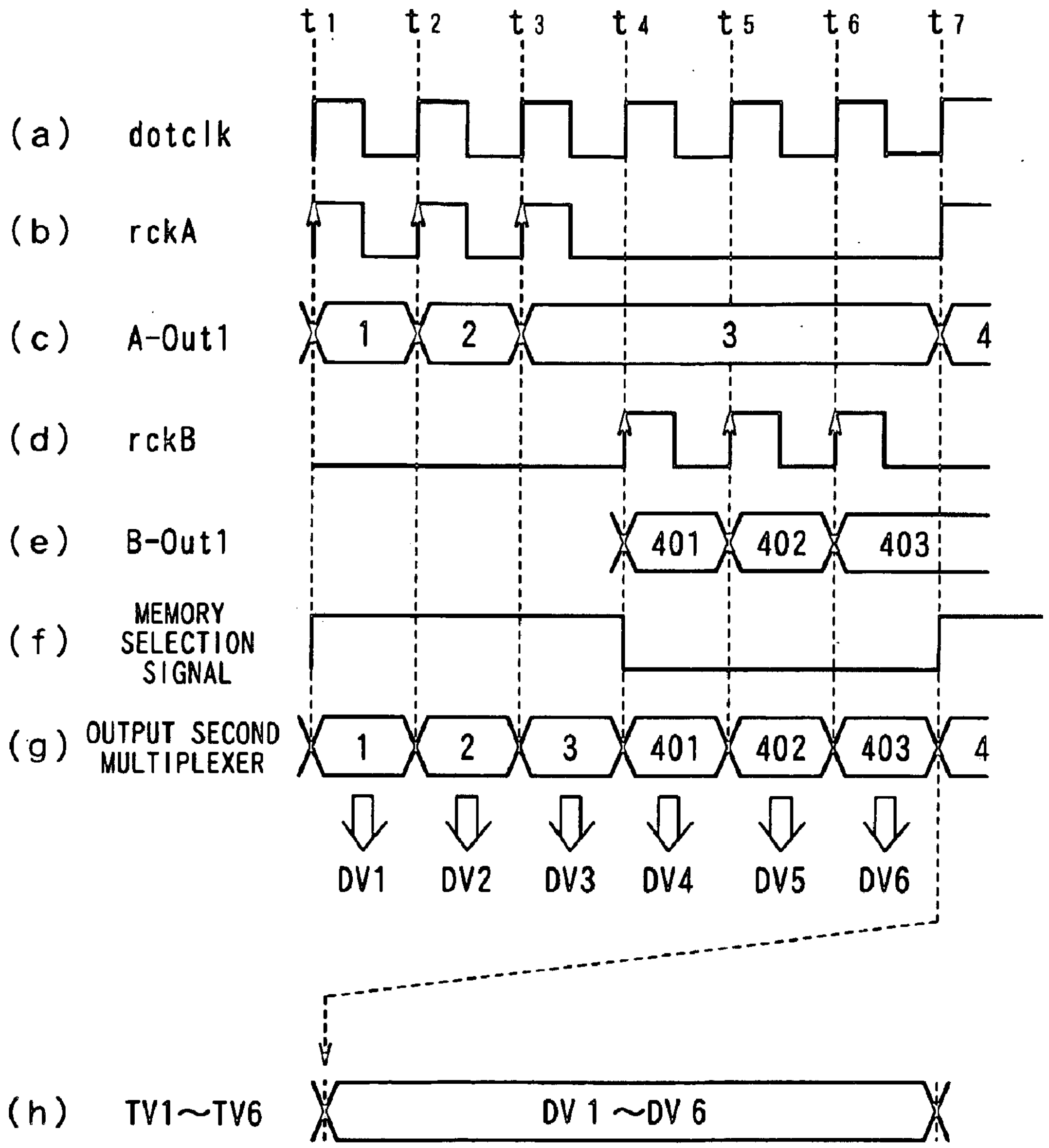
FIG. 11 is a timing chart for explaining the data reading operation of a circuit of the second embodiment with regard to the panel shown in FIG. 10.

After the aforementioned parallel data transfer, a read clock rckA or rckB (FIG. 11(*b*), (d)), obtained as a result of a logical product of a memory selection signal (non-inverted or inverted) which changes between H and L levels for every three dot clock periods as shown in FIG. 11(*f*), and a dot clock dotclk shown in FIG. 11(*a*), is supplied to each CK terminal of the shift register 360 of the output-side line memories 34*a*, 34*b*. Accordingly, the A-Out1 of the output-side line memory 34*a* of the first memory portion 30A sequentially outputs data corresponding to the first pixel, the second pixel and the third as shown in FIG. 11(*c*), each time the read clock rckA rises. When the memory selection signal falls from the H level to the L level at the timing t4, the data read out from the first memory portion 30A is interrupted, while a read clock rckb is supplied to the output-side line memory 34*b* of the second memory portion 30B. Accordingly, the B-Out1 of the output-side line memory 32*b* of the second memory portion 30B sequentially outputs data corresponding to the 401st, 402nd, and 403rd pixels, each time the read clock rckB rises. When the memory selection signal returns to the H level at the timing t7, the data read out from the second memory portion 30B is interrupted, and the data corresponding to the fourth, fifth and sixth pixels from the output-side line memory 34*a* of the first memory portion 30A is read. The similar process is thereafter repeated until the reading of the data corresponding to 400 pixels which are transferred in parallel into each of the output-side line memories 34*a* and 34*b* is completed.

The digital data corresponding to every three pixels sequentially read out from the output-side line memories 34*a* and 34*b* are supplied through the corresponding selectors 380A and 380B to the second multiplexer 390, as shown in FIG. 5. The memory selection signal of FIG. 11(*f*) is also supplied to the second multiplexer 390, which, in this example, selects the output from the first memory portion 30A to supply the data to the D/A 500 when the memory selection signal is at an H level and selects the output from the second memory portion 30B to supply the data to the D/A 500 when the memory signal is at an L level.

The D/A 500, which is a so-called six-stage D/A in the second embodiment, hold, in parallel, the data corresponding to the first to third pixels and the data corresponding to the 401st to 403rd pixels, namely the data corresponding to a total of six pixels, supplied as serial data during six dot clock periods, and applies to the held data such treatments as γ correction, brightness adjustment, and level adjustment, before further converting the data into the corresponding analog data (voltage signal) DV1~DV6, which are then output to the corresponding terminals TV1~TV6 shown in FIG. 10 during the six dot clock periods starting from the timing t7 as shown in FIG. 11(*h*).

As shown in FIG. 10, in the LCD panel 200 according to the second embodiment, the display area is divided in the horizontal direction into two regions, each of which is further divided into three phases, to thereby adopt a driving method in a manner of a total of six phase dividing. In the data line driver 210, the data supply lines DS are allotted for the left and right regions of the display area (DS1, DSr). Specifically, in the left region, three data supply lines DS11~DS13 are provided in the left region and are connected to the TV1, TV2 and TV3 terminals, respectively. Similarly, in the right region, three data supply lines DSr1~DSr3 are provided and connected to the TV4, TV5 and TV6 terminals, respectively. Three data supply lines DS11–13 are connected, via the corresponding switches SW 21 to the data lines 220-L1~L400 disposed at the left half of the display area in a continuous repeating pattern, and each data line is connected to one of the switches SW 21, the gates for every three switches being joined to a single output from the selector 212. Thus, the data line selector 212 can select three switches SW 21 at once. Similarly, in the right half of the display area, three data supply lines DSr1~r3 are connected via the corresponding switches SW 21 to the data lines 220-R1~R400 in a continuous repeating pattern, and each data line is connected to one of the switches SW 21, the gates for every three switches being joined to a single output from the selector 212, such that the data line selector 212 can select three switches SW 21 at once.

With the above structure, the data line selector 212 can select three data lines for each of the left and right regions, namely a total of six data lines, at the same time via each of the switches provided corresponding to the 800 data lines 220. The gate driver 205, on the other hand, selects one of the plurality of gate lines 250 and applies a gate voltage to the selected gate line 250, as in the first embodiment.

The operation of the LCD panel 200 shown in FIG. 10 will next be described using an example configuration in which the gate line 250-1 and a total of six data lines, specifically the data lines 220-L1, L2, L3 and 220-R1, R2, R3 corresponding to the output lines 221*a* and 221A from the data line selector 212 are selected. At this time, display data voltages DV1~DV6 are output to the corresponding terminals TV1~TV6, respectively, from the D/A 500 shown in FIG. 5 at the timing indicated in FIG. 11(*h*). Accordingly, data DV1 is applied from the TV1 terminal to the pixel electrode PX1 via the data supply line DS11, the data line 220-L1, and the TFT 260 which is controlled into an on state. Similarly, data DV2 is applied from the TV2 terminal to the pixel electrode PX2 via the data supply line DS12, the data line 220-L2, and the TFT 260 and data Dv3 is similarly applied from the TV3 terminal to the pixel electrode PX3. Also, data DV4 is applied from the TV4 terminal to the pixel electrode PX401 via the data supply line DSr1, the data line 220-R1, and the TFT 260 which is controlled into an on state. Similarly, data DV5 is applied from the TV5 terminal to the pixel electrode PX402 while data DV6 is applied from the TV6 terminal to the pixel electrode PX403.

During the following six dot clock periods, the D/A 500 outputs the data for the fourth, fifth, and sixth pixels (corresponding to DV1~DV3) and the data for the 404th, 405th, and 406th pixels (corresponding to DV4~DV6), obtained by digital to analog conversion, to the terminals TV1~TV6, respectively. At this time, the data line selector 212 controls the switches SW21 into an on-state via the output terminals 221*b* and 221B, such that the corresponding data lines 220-L4~L6 and 220-R4~R6 are selected, and therefore the data DV1~DV3 are supplied to the pixel electrodes PX4~PX6, respectively while the data DV4~DV6 are supplied to the pixel electrodes PX404~PX406, respectively.

With the same gate line 250-1 selected, the data lines at the right side columns in each of regions are sequentially selected in the similar manner, and the writing of the display data corresponding to one row to the pixels is completed, when the data DV1~DV6 are applied to the pixel electrodes PX398~PX400 and PX798~PX800. Such a process is repeated while selecting the gate line 250 one by one in the lower direction for every 1H period, and the data writing corresponding to one screen is completed when the gate line 250-*y* at the lowest row of the display area is selected for writing the data into the corresponding pixel electrodes at this row.

From the foregoing descriptions for the first and second embodiments, it can be understood that the LCD drive IC according to the present invention can use the memory 300 of the same structure to deal with the change in the number of phases to be driven. In the first embodiment in which the LCD panel is divided into two regions, the two-stage D/A can be used to execute digital to analog conversion for the two phase data. As long as the D/A 500 is capable of multiple converting, it is not necessary to change the structure of the D/A 500 even when the number of the phases of the LCD to be driven changes. For example, in order to deal with the process for two or more phases as in the second embodiment, a D/A which is capable of executing a digital to analog conversion at the expected maximum number of stages may be adopted in advance. When, depending on the number of phases for the LCD panel to be driven, not all the stages in the D/A are used, it is possible to prohibit the operation of unnecessary stages.

Further, the LCD drive IC of the present invention can employ the same structure to deal with the change in the number of pixels in the horizontal direction of an LCD panel. Various types of LCD panels having different number of pixels are known, including the SVGA type panel having 800 pixels in the horizontal direction which is used in the above-mentioned first and second embodiments, the VGA type having 640 pixels in the horizontal direction, the XGA type having 1024 pixels in the horizontal direction, or the like. The LCD drive IC of the present invention can perform a data process for the various types of the LCD panels having the different number of pixels in the horizontal direction using the memory 300 comprising the same structure. Such flexibility of the memory 300 relies on the structure shown in FIG. 5 and FIGS. 6A–6C.

Specifically, as shown in FIG. 6A, each of the input-side line memories 32*a* and 32*b* of the memory 300 is composed of a shift register comprising 400 stages of FFs32, and the Q output terminal of each FF32 is connected via the input data switch circuit 350 to the D input terminal of the corresponding FF34 of the output-side line memory 34*a*, 34*b*.

Further, each of the output-side line memories 34*a*, 34*b* have the outputs Out1-Out4 (A-Out1-4, B-Out1~4) provided at the predetermined locations of the shift register 360, more specifically the Q output terminals of the FF34-400, FF34-320, FF34-256, and FF34-1.

When the shift direction switching circuit 340 is in a data shift mode in the right direction, each of the outputs Out1~Out3 serially outputs a digital video signal in the order it was input to the input-side line memory 32. In the case of an LCD having 512 pixels, instead of 800 pixels, in the horizontal direction, for example, the maximum number of data to be input to the input-side line memory 32*a*, 32*b* of each of the first and second memory portions 30A and 30B is 256. Accordingly, the selectors 380A and 380B select A-Out3 and Bout3, respectively, and the A-Out 3 serially outputs display data (data corresponding to the pixels PX1~PX256) sequentially transferred to the 256th FF34 from the FFs34 at the left side, while the B-Out 3 serially outputs display data (data corresponding to the pixels PX257–PX514) in the order it was input to the memory earlier, which is transferred to the 256th FF34 sequentially from the FFs34 at the left side. Further, due to selection of the Out3, the regions of FF32-257~400 and FF34-257~400 in the input side and output-side line memories will not be substantially used.

When the LCD panel 200 has 640 pixels in the horizontal direction, the selectors 380A and 380B shown in FIG. 5 select A-Out2 and B-Out2, respectively, so that the A-Out2 outputs display data (data corresponding to the pixels PX1~PX320) corresponding to Q outputs from the 320th FF34 and the B-Out2 serially outputs display data (data corresponding to the pixels PX321~PX640) in the order it was input to the memory earlier.

In the data shift mode to the right direction, it is thus possible to drive any type of LCD panel having 800, 640 and 514 pixels in the horizontal direction merely by selecting the outputs Out1–Out3 of the output-side line memory 34*a* and 34*b* by the selectors 380A and 380B.

The total number of words of the input side and output-side line memories 32, 34, that is, the number n of stages of the shift registers 32 and 360 in the example structure shown in FIG. 6A, is not limited to 400. When a drive IC is mostly used for the XGA type LCD panels, for example, the maximum data to be held for each memory portion 30A, 30B is chosen to be 512 so as to drive the panels having a display area divided into two regions in the horizontal direction. It is therefore desirable to provide a 512-stage shift register in each of the input side and output-side line memories. For the LCD panels having a different number of pixels, an output OUTx may be provided at a predetermined location, which corresponds to pixel number of less than 512 (400, 320, 256 or the like) and the selectors may select the Outx.

Further, although the outputs may be provided at any locations of the output-side line memory 34, the locations corresponding to 320th and 400th pixels are preferable because one fourth of the number of pixels in the SXGA panel is 320, this being equal to half of the number of pixels in the VGA panel, and one fourth of the number of pixels in the UXGA panel is 400, this being one half of the number of pixels in the SVGA panel. Also, the pixel number of 256 is regarded as one standard for processing a video signal by a computer or the like. Namely, under the standard of current display devices, the number of pixels is usually a multiple of any of 256, 320, and 400, which is believed to remain unchanged in the future. Therefore, when a drive IC has a storage capacity (the number of stages for FF) capable of storing data corresponding to 256, 320, and 400 pixels and also has the output terminals leaded from the corresponding pixel locations, such an IC can have a higher possibility to deal with various types of display devices having different number of pixels with a higher flexibility. Accordingly, with the input side and output-side line memories each having the maximum number of storage data of 400 as used in this embodiment, the IC can flexibly deal with any of the aforementioned 256, 320 and 400 pixels. Also, as the number of pixels is often set by using, as a unit, 512 pixels, which is a double of 256, it is also possible to use a memory having the maximum number of storage data of 512 at each input and output side. It is however desirable to minimize the storage capacity of the line memory because the memory area increases with the increase in the storage capacity of the memory.

In order to utilize the input side and output-side line memories 32, 34 each having a storage capacity corresponding to 400 or 512 pixels to deal with large size LCD panels such as the SXGA type (with 1280 pixels in the horizontal direction) and the UXGA type (with 1600 pixels in the horizontal direction) as described after, the display area may be divided, in the horizontal direction, into more than two regions, each of which may include a corresponding memory portion. For example, it is possible to divide the display area into four regions such that data is stored in each of the first to fourth memory portions 30A, 30B, 30C, and 30D corresponding to the respective four regions.

The selectors 380A and 380B shown in FIG. 5 may be eliminated when the second multiplexer 390 is provided with an input switch function. Further, instead of providing the selectors 380A and 380B, an unnecessary output terminal of the output terminals Out1–Out4 of the output-side line memory 34 may be separated from the second multiplexer 390 by laser irradiation or the like.

With the above structure, the present invention eliminates a need for preparing the input side and output-side line memories 32, 34 having different number of words (the m total number of addresses) depending on the number of pixels of an LCD to be driven. More specifically, preparation for different line memories, such as a line memory with 320 words, that being half the total number of pixels in the horizontal direction for controlling the VGA panel divided into two horizontal region, and a line memory with 256 words, which is one fourth of the total number of pixels in the horizontal direction, for controlling the XGA panel divided into four horizontal regions, may be eliminated.

Manufacture of a drive IC for each of the LCDs with different number of pixels results in a decrease in the production volume for each type of IC, which makes it difficult to realize cost savings through mass production. According to the present invention, in which an IC having flexibility is provided such that various types of LCD panels having different number of pixel can be driven by the IC with the same structure, overall manufacturing cost can be reduced.

Figure 12A:
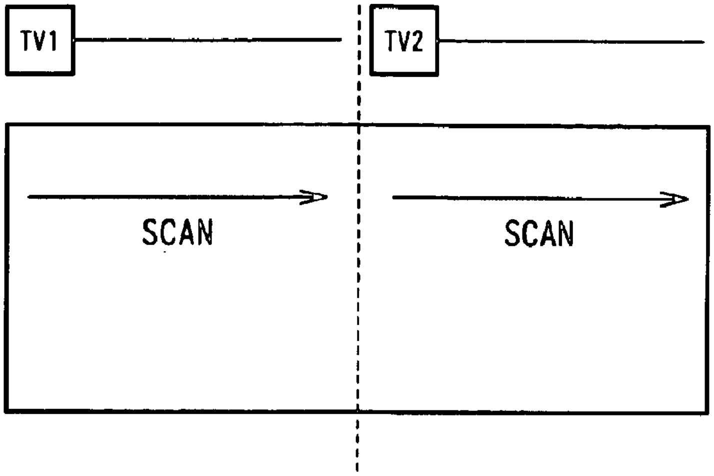
FIGS. 12A, 12B, and 12C are conceptual views for explaining the forward and backward scanning operations of the display area.

A third embodiment of the present invention, in which another drive method for the display area of an LCD panel, and another operation method for reading data from the output-side line memory 34, is used, will be now described. In the foregoing first and second embodiments, as shown in FIG. 12(A), the display area is divided in two regions in the horizontal direction, referred to as left and right regions, in each of which a display data voltage is applied sequentially from the pixel at the left end. In the following descriptions, data writing when the pixels are selected sequentially from the left side to the right side will be referred to as "forward scanning", while the data writing when the pixels are selected sequentially from the right side to the left side will be referred to as "backward scanning".

Figure 12B:
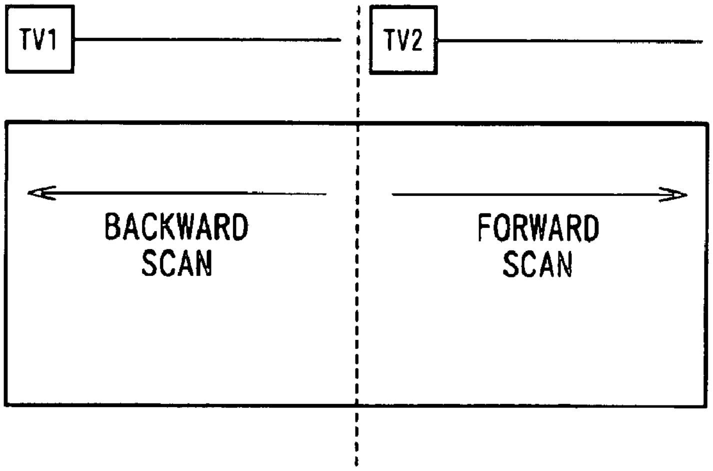
Figure 12C:
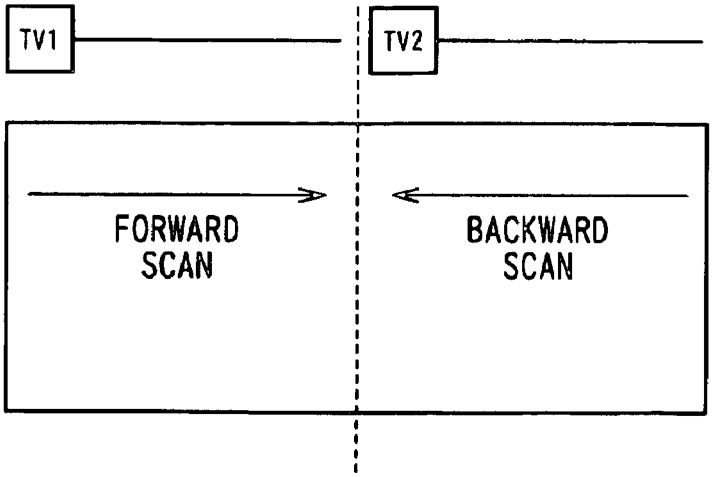

When the forward scanning is carried out in each of the two divided regions, as shown in FIG. 12A, the pixel to be selected last in the left region and the pixel to be selected first in the right region are adjacent to each other in the center of the screen. When the amount time that has elapsed since voltage application differs among the pixels, a difference in brightness is caused among the pixels according to the difference in the elapsed time. The drive method of FIG. 12A causes such a brightness difference between the pixels at the center of the screen which leads to degradation in display quality. In order to overcome such a brightness difference in pixels, backward scanning may be performed in any one of the left and right regions, so that voltage application is executed at the same time at the center of the screen as shown in FIGS. 12B and 12C.

When the backward scanning is carried out, a shift direction switch signal of L level is supplied to the shift direction switch circuit 340 shown in FIGS. 6A and 6B, and a Q output of the (m+1)th FF34 is supplied to the D input of the m-th FF34. Further, when the selector 380 selects the output terminal Out4 provided in the output-side line memory 34, the Out4 outputs data sequentially transmitted from an FF34 to another FF34 in the shift register 360 from left to right, as serial data. As already described, in the input-side line memory 32, data corresponding to the pixel in the left region of the display area is sequentially supplied to the FF32-1 provided at the left and, such that data supplied to the FF32 at the right side of the diagram is the earliest held, and therefore oldest, data. The data, corresponding to the pixel to the left in the display area, which is then supplied to the corresponding FF34 of the shift register 360 in the output-side line memory 34. This also means that the data supplied to the FF34 at the right side of the diagram is the earliest held, therefore oldest, data, corresponding to the pixel at the left in the display area. Accordingly, when data shift in the shift register 360 is performed in the left direction and the Out4 is selected to output data, the Out4 can output the stored data sequentially from the last held, newest, data (data corresponding to the pixel at the right in the display area).

Further, for the display area to be driven by the memory portion 30 in which the Out4 is thus selected, the selector of the data line driver 210 selects the data lines sequentially from right to left, for example, from the data line 220-R400 to the data line 200-R1, or from the data line 200-L400 to the data line 200-L1.

Figure 13:
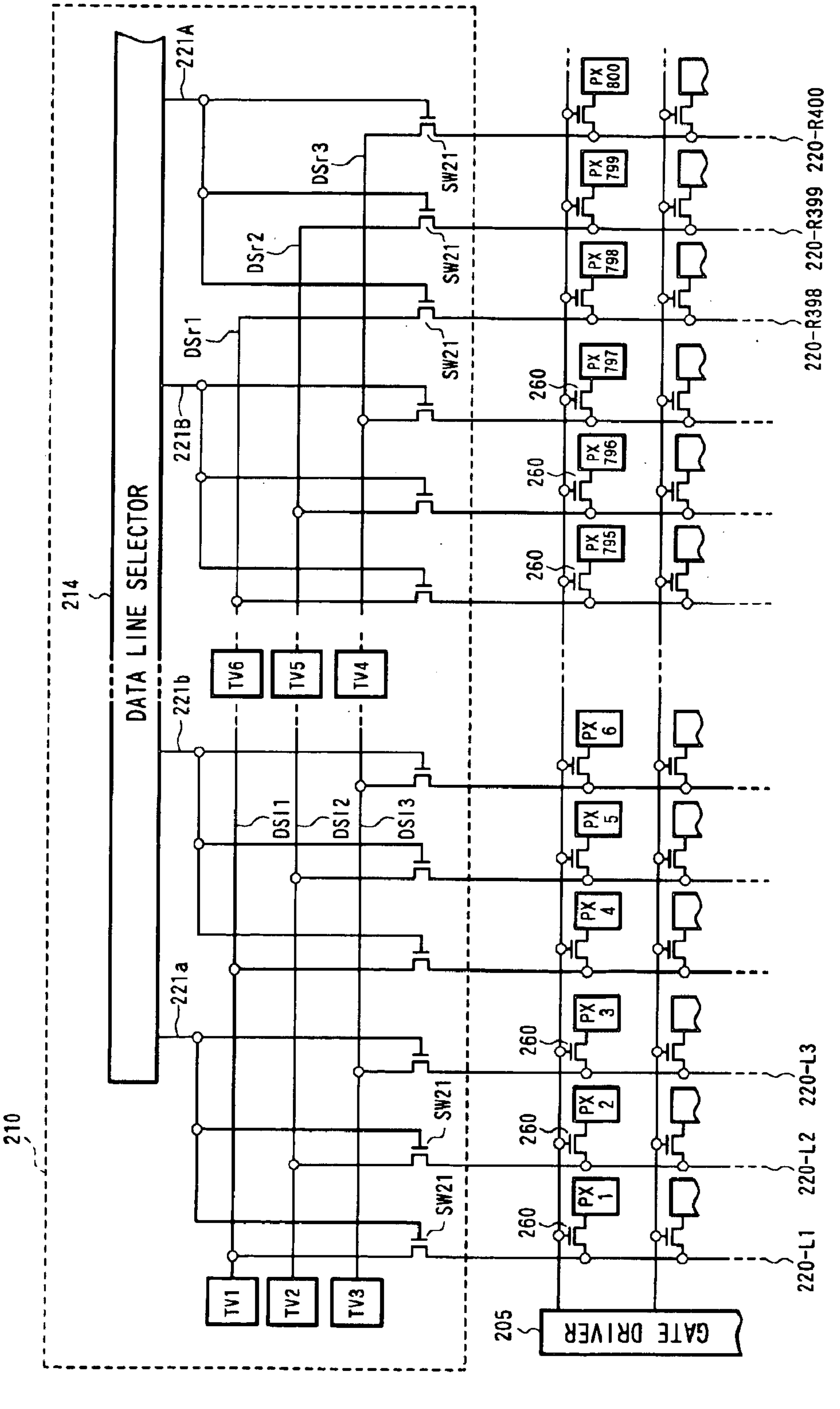
FIG. 13 is a diagram depicting the structure of an LCD panel to be driven in two-region three-phase dividing manner according to a third embodiment of the present invention.
Figure 14:
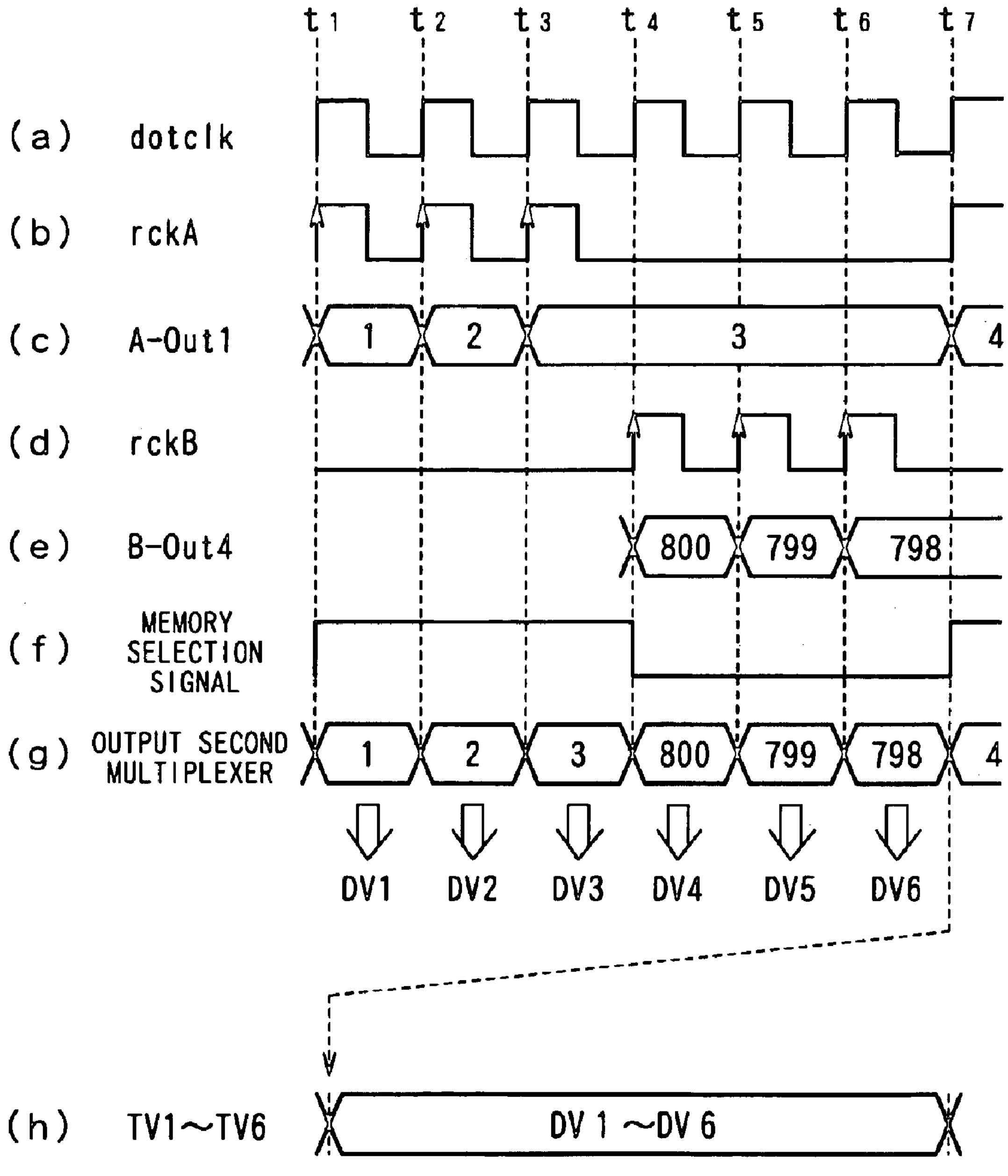
FIG. 14 is a timing chart for explaining the data reading operation of a circuit of the third embodiment with regard to the panel shown in FIG. 13.

This backward scanning will be further described with reference to FIGS. 13 and 14, which depict an example case where an LCD panel 200 having 800 pixels in the horizontal direction is driven by a six-phase division method in a manner that the LCD panel is divided into two regions in the horizontal direction, namely left and right regions, each of which is further divided into three phases. FIG. 13 depicts the structure of the LCD panel to be driven by the backward scanning, and FIG. 14 depicts drive wave forms. The LCD panel of FIG. 13 is driven by the drive IC having the same structure as that of the IC of the above-described second embodiment.

The following descriptions will be made assuming that the selector 380A shown in FIG. 5 selects the output A-Out1 of the first memory portion 30A while the selector 380B selects the B-Out4 of the second memory portion 30B. Input of a video signal to each of the input-side line memory 32*a*, 32*b* of the first and second memory portion 30A, 30B, and the parallel data transfer from the input line memory 32*a*, 32*b* to the output-side line memory 34*a*, 34*b* is performed in the same manner as in the foregoing first and second embodiment and will not be described.

After the parallel data transfer from the input-side line memory 32*a*, 32*b* to the output-side line memory 34*a*, 34*b*, when a memory selection signal of FIG. 14(*f*) becomes an H level at the timing t1 shown in FIG. 14, a read clock rckA is output to the output-side line memory 34*a*. As the read clock rckA is supplied to the CK terminal of each FF34 of the output side shift register 360, as shown in FIG. 6A, the data held in each FF34 is transferred to the adjacent FF34 in the right direction each time the read clock rises (at the timing of t1, t2, t3). Accordingly, as shown in FIG. 14(*c*), digital video data corresponding to the first, second, and third pixels are sequentially output from the A-Out1.

The memory selection signal changes to an L level at the timing t4, which causes a read clock rckb shown in FIG. 14(*d*) to be supplied to the output-side line memory 34*b* of the second memory portion 30B. As described above, the data shift mode for the output-side line memory 34*b* of the second memory portion 30B is set to be a left direction mode by a shift direction switch signal. Therefore, when the read clock rckB is supplied to the CK terminal of each FF34 of the shift register 360, the data held in each FF34 is transferred to the adjacent FF34 at the left side each time the clock rckB rises (at the timing t4, t5, t6). At the same time, for the second memory portion 30B, the B-Out4 is selected by the selector 380B, so that the digital video signal corresponding to the 800th, 799th, 798th pixels are sequentially output from the BOut4 in response to the rise of clock rckB, as shown in FIG. 14(*e*).

As shown in FIG. 14(*g*), the second multiplexer 390 supplies the output from the first memory portion (A-Out1) to the D/A 500 when the memory selection signal is at the H level and supplies the output from the second memory portion (BOut4) to the D/A 500 when the memory selection signal is at the L level.

The D/A 500 applies necessary treatments such as $\gamma$ correction, brightness adjustment, and level adjustment to the digital data corresponding to the first, second, third, 800th, 799th, and 798th pixels supplied during the period from timing t1–t7, and also converts the digital data into corresponding analog data DV1~DV6, which are then supplied to the corresponding terminals TV1~TV6 of the LCD panel shown FIG. 13 during six dot clock periods from timing t7–t12 (not shown).

The LCD panel shown in FIG. 13 differs from the above-mentioned LCD panel of FIG. 10 in that the data supply lines DSr1, DSr2, and Dsr3 of the data line driver 210 are connected to the respective terminals TV6, TV5, and TV4. Further, with regard to the left region of the display area, the data line selector 214 of FIG. 13 selects the outputs 221*a*, 221*b* . . . sequentially from the left for every three dot clock periods, as in the data line selector 212 of FIG. 10, to control the corresponding switches SW21 to an on-state for selecting, in order, the data lines 220-L1–L3, 220-L4–L6 . . . With regard to the right region of the display area, however, the data line selector 214 of FIG. 13 selects the outputs 221A, 221B . . . sequentially from the right for every three dot clock periods, contrary to the data line selector 212 of FIG. 10, to control the corresponding switches SW21 to an on-state. The data lines 220 are thus subjected to backward scanning in the right region of the display area for selecting, in order, the data lines 220-R400-R398, 220-R397~R395 . . . .

Accordingly, the data line selector 214 selects a total of six data lines corresponding to the outputs 221*a* and 221A disposed at both the left and right ends during six dot clock periods starting from the timing t7. As a result, the data DV1~DV3 corresponding to the first, second, and third pixels are supplied to the corresponding to three data lines 220-L1–L3, respectively, via the corresponding data supply lines DS11~DS13, and the data DV1~DV3 are then applied to the corresponding pixel electrodes PX1~PX3. Similarly, the data DV4~DV6 corresponding to the 800th, 799th, and 798th pixels are supplied to the corresponding three data lines 220R400~R398, respectively, via the corresponding data supply lines DSr3~DSr1, and the data DV4~DV6 are then applied to the corresponding pixel electrodes PX800~PX798.

During the following six dot clock periods, converted analog data of the data corresponding to the fourth, fifth, and sixth pixels output from the A-Out1 of the first memory portion 30A are supplied to the data lines 220-L4~L6, respectively. Similarly, converted analog data of the data corresponding to the 797th, 796th, and 795th pixels output from the B-Out4 of the second memory portion 30B are supplied to the data lines 220-R397~R395, respectively.

The foregoing process will be repeated during 1H period, such that the display data corresponding to the 1H can be written into all the pixels connected to the first gate line 250-1. When the data writing is similarly repeated and the data writing for the data line 250-*y* at the lowest row of the display are is performed, the data writing for one screen is completed.

As described above, the drive IC 100 according to the third embodiment can deal with the LCD in which one of the left and right regions is driven by backward scanning, only with a change in the selection by the selectors 380A and 380B of the output terminals Out1~Out4 of the output-side line memories 34*a*, 34*b* and without a significant change in the circuit within the IC. Thus, both the LCD in which backward scanning is performed and the LCD in which only forward scanning is performed can be driven by the same drive IC, and by the memory 30 having the same structure, to thereby allow for reduction in manufacturing cost.

The operation according to the fourth embodiment in which the LCD drive IC of the present invention is applied to an LCD panel which provides a so-called mirror image will be described. A mirror image is used in a case, for example, where an electrical view finder (EVF) of a digital video camera is reversed to direct the display area of the EVF toward the objective side so as to take a picture of a photographer. This is because a mirror image in which left and right is reversed is mainly obtained in the case of such EVF reversal.

The LCD drive IC according to the present invention can also deal with such mirror image display using the memory 300 having the structure shown in FIG. 5. Further, as long as the adopted D/A 500 is capable of conversion at multiple stages, further change in the structure is not necessary for the D/A 500.

Figure 15:
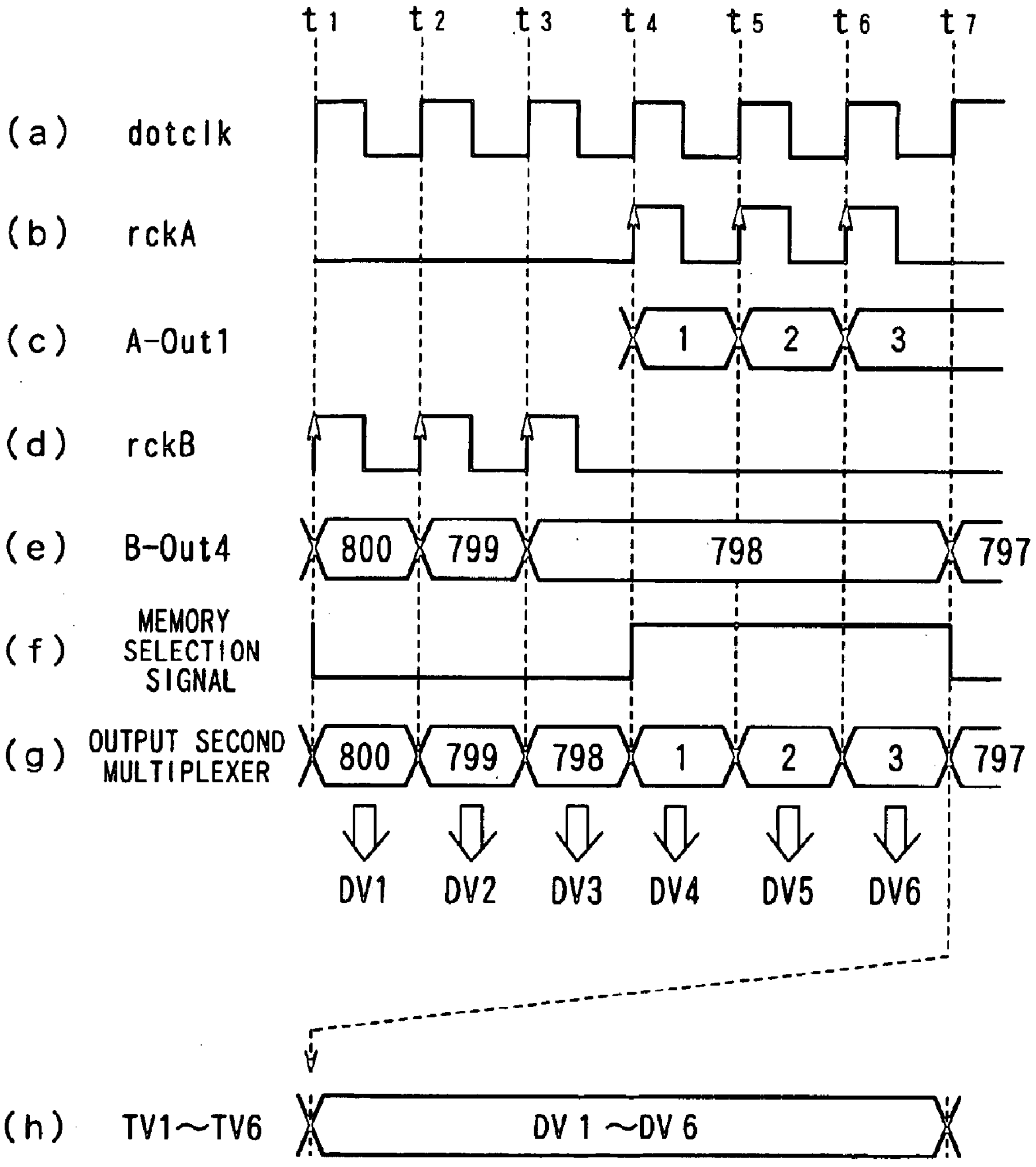
FIG. 15 is a timing chart for explaining the data reading operation according to a fourth embodiment with regard to a panel performing mirror image display.

The operation of a mirror image display type LCD will be qo described with reference to FIGS. 5, 6A–6C, 13 and 15, in a case where the SVGA panel having 800 pixels in the horizontal direction is driven in a two-region three-phase dividing manner as in the above-mentioned third embodiment. FIG. 15 depicts a data output process from the output-side line memory 34 in this mirror image display.

An externally applied digital video signal is serially input via the first multiplexer 310 to both of the input-side line memories 32*a* and 32*b* of the first and second memory portions 30A and 30B. Specifically, the data corresponding to the former half of 1H period (left region of the display area) is input to the input-side line memory 32*a*, and the data corresponding to the latter half of 1H period (right region of the display area) is input to the input-side line memory 32*b*. When writing of the data corresponding to 1H into all of the FFs32 in the input-side line memories 32*a* and 32*b* is completed, the written data are transferred in parallel to the corresponding FF34*s* of the output-side line memories 34*a* and 34*b*. The process up to this point is the same as that in the first embodiment.

In the normal display mode, as in the foregoing third embodiment, data is read out from the first memory portion 30A which stores the data corresponding to the earlier half (the left region) in the horizontal direction, of the first and second memory portions 30A and 30B (see FIGS. 11 and 14). When the LCD panel is reversed, for example, such a reversal is detected such that the LCD enters a mirror image display mode in which the change in the timing of a memory selection signal between L and H levels is opposite to that in the normal display mode, as shown in FIG. 15(*f*). Namely, after the parallel data transfer, the memory selection signal becomes an L level during three dot clock periods from timing t1 to timing t4 and then becomes an H level during the following period from timing t4 to t7. Therefore, a read clock rckB as shown in FIG. 15(*d*) is supplied to each CK terminal of the shift register 360 of the output-side line memory 34*b* during the period of timing t1~t4, and then a read clock rcka as shown in FIG. 15(*b*) is supplied to each CK terminal of the shift register 360 of the output-side line memory 34*a* during the subsequent period of timing t4~t7.

Further, in the mirror image display mode, the selector 380A shown in FIG. 5 selects the output A-Out1 of the first memory portion 30A while the selector 380B selects the output B-Out4 of the second memory portion 30B. The output B-Out4 of the output-side line memory 34*b* of the second memory portion 30B outputs the data corresponding to the 800th, 799th, and 798th pixels in the display area in this order each time the read clock rckB rise at each timing t1, t2, and t3. When the memory selection signal becomes an H level at the timing t4, the output A-Out1 of the output-side line memory 34*a* of the first memory portion 30A outputs the data corresponding to the first, second, and third pixels in the display area in this order each time the read clock rcka rise at each timing t4, t5, and t6, and the data are then supplied via the selector 380A to the second multiplexer 390.

The memory selection signal of FIG. 15(*f*) is also supplied to the second multiplexer 390. The second multiplexer 390, when the memory selection signal is at an L level, selects the output from the B-Out4 of the second memory portion 30B to supply the output to the to D/A 500 and, when; the memory selection signal is at an H level at the timing t4, selects the output from the first memory portion 30A to supply the output to the D/A 500. The read out operation of data corresponding to three pixels from each of the memory portions will be repeated in a manner that the data in one of the two memory portions are read out in the order opposite to the order of data input, until reading of the data corresponding to all the 400 pixels which are transferred in parallel to the respective output-side line memories 34*a* and 34*b* is completed.

The D/A 500 is a six-stage D/A as in the second and third embodiments, which holds the data corresponding to a total of six pixels, namely the data corresponding to the 800th~798th pixels and the first to third pixels, which are sequentially supplied as serial data during six dot clock periods, and applies γ correction, brightness adjustment, level adjustment, or the like to the data before converting the data into the corresponding analog data DV1–DV6.

As shown in FIG. 13, the LCD panel 200 is divided into two regions, namely the left and right regions. In the left region, data DV1–DV3 to be supplied to the terminals TV1–TV3, respectively, are supplied to every three of the data lines 220 (L1–L3, L4~L6, . . . L398–L400) which are sequentially and correspondingly selected. In the right region, on the other hand, data DV4–DV6 to be supplied to the terminals TV4–TV6, respectively, are supplied to every three of the data lines 220 (R400~R398, R397~R395, . . . R3–R1) which are similarly correspondingly sequentially selected.

As in the above-mentioned first to third embodiments, the D/A 500 of this embodiment converts the digital data output from the second multiplexer 390, in the order it was output, into the corresponding analog data DV1~DV6, which are then supplied to the corresponding terminals TV1~TV6 shown in FIG. 13. Therefore, in this fourth embodiment, the analog data corresponding to the 800th, 799th, and 798th pixels are supplied to the terminals TV1, TV2, and TV3, respectively, as the data DV1, DV2, and DV3, during the six dot clock periods starting from timing t7. During the same six dot clock periods, the analog data corresponding to the first, second and third pixels are supplied to the terminals TV4, TV5, and TV6, respectively, as the data DV4, DV5, and DV6.

As in the aforementioned third embodiment, the data line selector 214 shown in FIG. 13 selects the outputs 221*a*, 221*b*, . . . in order from the left in the left region in the figure. Therefore, every three data lines 220L1–L3, L4–L6 . . . are sequentially selected in order from the left via the switch SW21 corresponding the selected output 221*a*, 221*b*, . . . On the other hand, the data line selector 214 selects the outputs 221A, 221B, . . . , in order from the right in the right region in the figure. Therefore, every three data lines 220R400-R398, R397~R395, . . . , are sequentially selected in order from the right via the switch SW21 corresponding the selected output 221A, 221B, . . .

During the six dot clock periods from timing t7 as shown in FIG. 15, for example, the data DV1 corresponding to the 800th pixel is supplied via the data supply line DS1 from the terminal TV1 to the data line 220-L1, and is then supplied to the pixel electrode PX1 via the TFT 260 which is controlled to be in an on-state by the gate driver 205. Similarly, the data DV2 corresponding to the 799th pixel is supplied via the data supply line DS12 from the terminal TV2 to the data line 220-L2, and is then supplied to the pixel electrode PX2, while the data DV3 corresponding to the 798th pixel is supplied via the data supply line DS13 from the terminal TV3 to the data line 220-L3, and is then supplied to the pixel electrode PX3. During the same six dot clock periods from timing 7, the data DV4 corresponding to the first pixel is supplied via the data supply line DSr3 from the terminal TV4 to the data line 220-R400, and is then supplied to the pixel electrode PX800 via the TFT 260 which is controlled to be in the on-state by the gate driver 205. Similarly, the data DV5 corresponding to the second pixel is supplied via the data supply line DSr2 from the terminal TV5 to the data line 220-R399, and is then supplied to the pixel electrode PX799, while the data DV6 corresponding to the third pixel is supplied via the data supply line DSr1 from the terminal TV6 to the data line 220-R398, and is then supplied to the pixel electrode PX798.

In this manner, in the left region of the display area, the data input to the memory portion 30 corresponding to every three of the 797th–401st pixels are sequentially written in this order into the pixels from the left end, while in the right region, the data input to the memory portion 30 corresponding to every three of the fourth to 400th pixels are sequentially written in this order into the pixels from the right end, to thereby enable the display of a mirror image relative to the input data.

The switching between the normal display and the mirror image display can be performed, for example, by providing a circuit for detecting rotation of an EVF to output a mirror image control signal for executing mirror image display, such that the operation in the drive IC, for example, the level reverse of a memory selection signal, can be controlled based on the output signal.

Further, when the EVF is reversed as described above so as to display a mirror image in which top and bottom are also reversed, the gate driver, which sequentially selects the gate lines from the top row to the bottom row of the panel at the time of normal display mode, may sequentially select the gate lines in the opposite order, namely from the bottom row to the top row.

It is thus possible to obtain mirror image display without any modifying processes other than reversing the polarity of a memory selection signal to change the order of data read out in the normal display, that is, from the second to first memory portion, to the order of data read out in the mirror image display, that is, from second to first memory portion and selecting the output Out4 instead of the Out1 in one memory portion. Further, since the D/A 500 merely outputs the input data to each terminal TV1–TV6 in the order it was input, as described above, the operation of the D/A 500 is the same both for the normal and mirror image display and can thus deal with two different display modes with the same structure.

A fifth embodiment of the present invention, in which a UXGA panel having 1600 pixels in the horizontal direction is driven using the LCD drive IC according to the present invention, will next be described. Although in the foregoing first to fourth embodiments, the LCD panel is driven in such a manner that the display area thereof is divided in the horizontal direction into two regions, namely left and right regions, in this fifth embodiment the LCD panel is driven in a manner that the display area is divided in the horizontal direction into more than two regions, for example, four regions.

Figure 16:
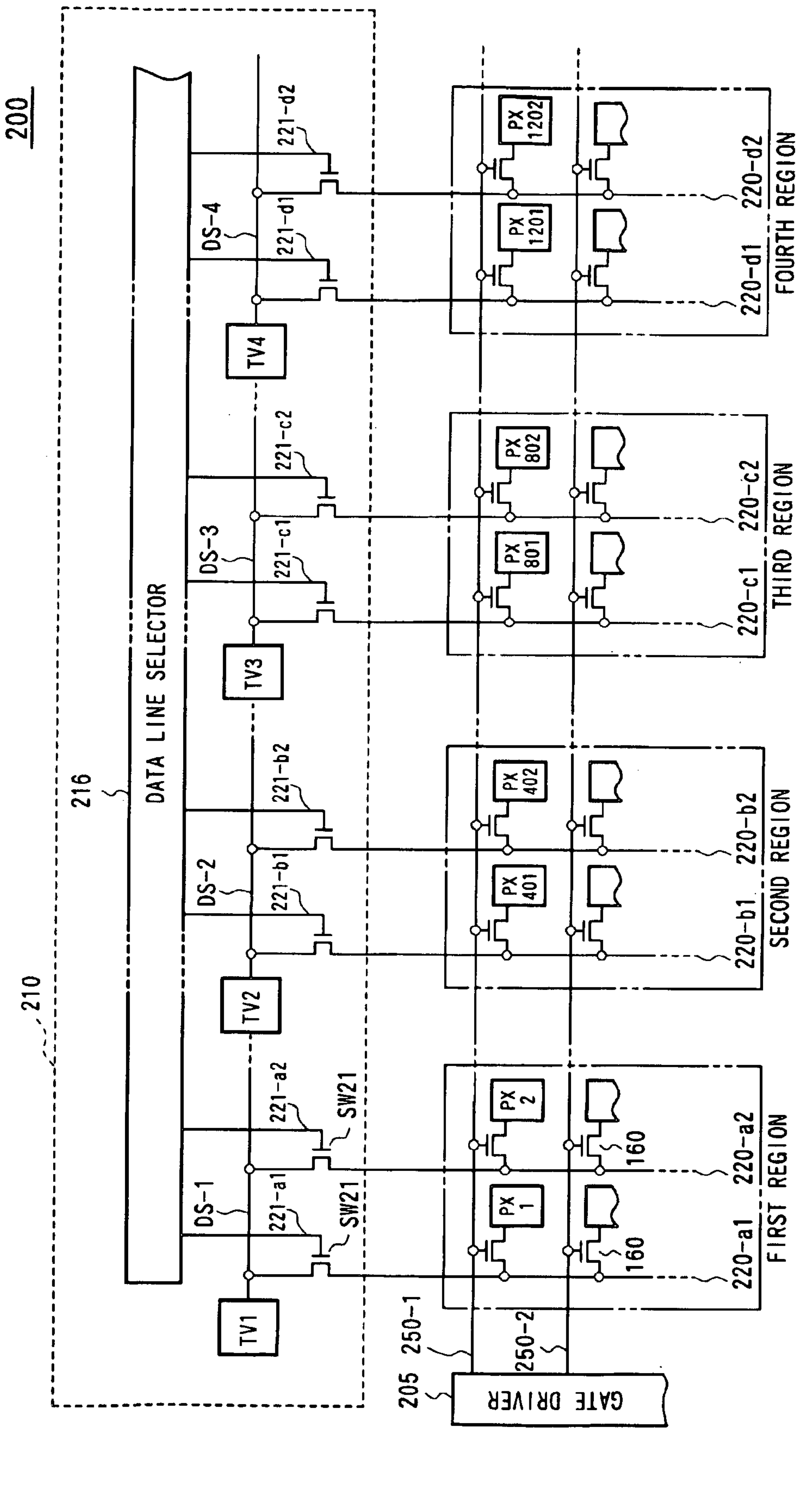
FIG. 16 is a diagram depicting the structure of an LCD panel to be driven in a four-region dividing manner according to a fifth embodiment of the present invention.

FIG. 16 depicts the structure of such an LCD panel 200, in which the display area is divided in the horizontal direction into four regions, in each of which display data is supplied from one of the terminals TV1–TV4 provided corresponding to each region to each pixel via the corresponding one of the data supply line DS-1-DS-4. The data line selector 216 selects a total of 1600 data lines 220 (220-*a*1~*a*400, 220-*b*1~*b*400, 220-*c*1~*c*400, 220-*d*1~*d*400) via the corresponding switches Sw21, respectively. At this time, a total of four data lines (one for each region) can be selected at the same time in the four regions, in each of which the data lines are selected from the left end to the right end.

Additionally, the LCD panel according to above UXGA panel can be driven by the drive IC comprising the first and second memory portions 30A and 30B of the memory 300 of FIGS. 5 and 6A, each having the maximum storage capacity of the input and out line memories corresponding to 800 pixels. With the use of such memory having a capacity corresponding to 800 pixels, additional change in design is not necessary for other part of the structure, such as for the first and second multiplexer 310, 390 and the selectors 380A and 380B. Further, as already described in the second to fourth embodiments above, by incorporating a multiple-stage D/A, for example a six-stage D/A, into an IC in advance, it is not necessary to change the D/A 500 for use in the UXGA panel. Also, the various drive methods in the first to fourth embodiment can be uses as a drive method for this embodiment by appropriately selecting any of the memory output A-Out1~4 and B-Out1~4 by the respective selectors 380A and 380B, in accordance with each method.

Figure 17A:
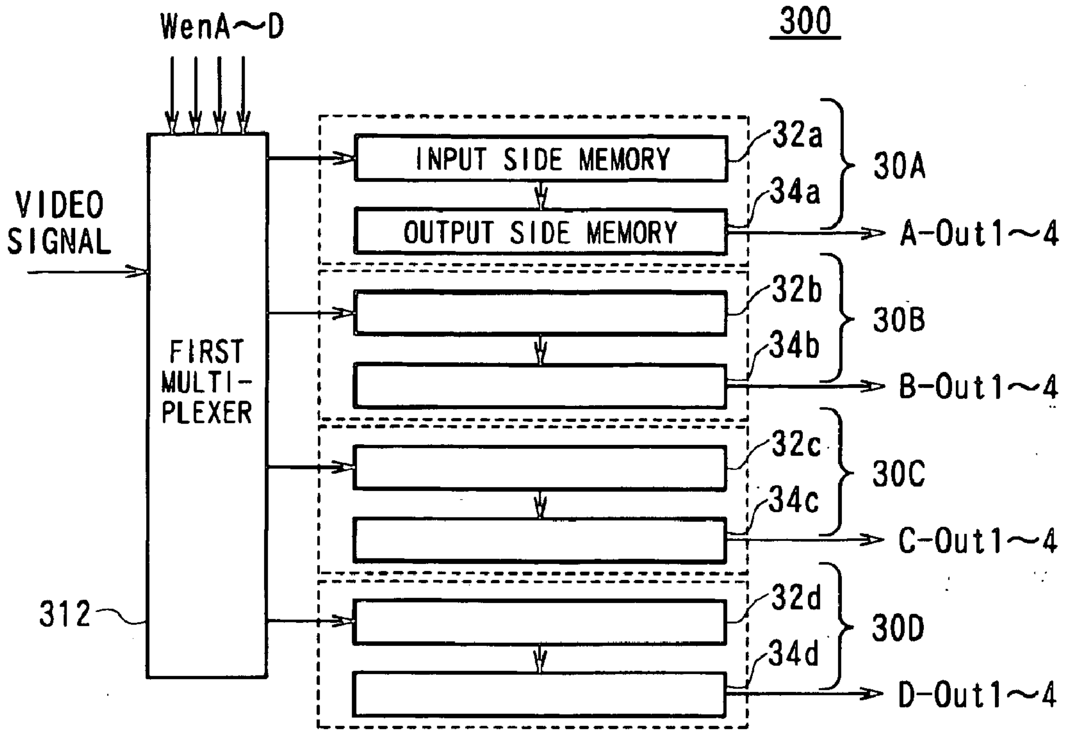
FIGS. 17A and 17B are diagrams depicting an example structure of a memory 300 according to the fifth embodiment.
Figure 17B:
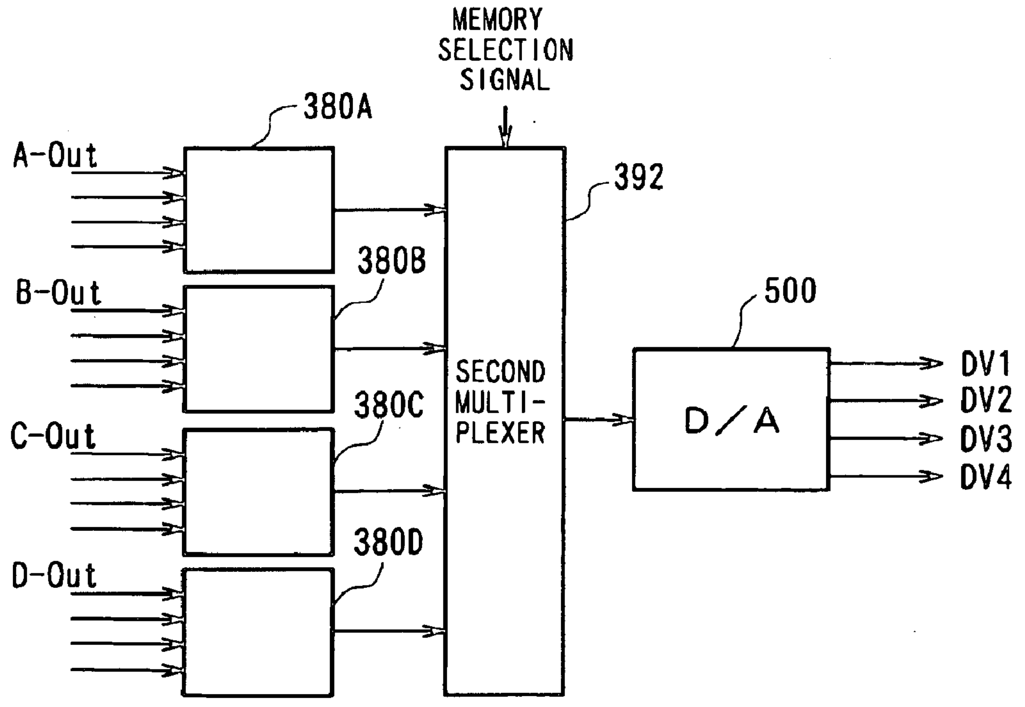

FIGS. 17A and 17B depict one example structure of the memory 300 of the LCD drive IC for driving the above-mentioned panel 200. When two of the memory portions each having the storage capacity corresponding to 400 pixels as in the foregoing first to fourth embodiments are provided so as to drive an UXGA panel having 1600 pixels in the horizontal direction, the data writing to the input-side line memory 32 must be performed twice, which further requires a change in the writing control used for driving the panel having the number of pixels other than 1600. Accordingly, in this embodiment, as shown in FIGS. 17A and 17B, another set of memories having the same structures as the above mentioned memory portions 30A and 30B are further provided, such that a total of four memory portions 30A, 30B, 30C and 30D can be used to hold and output the input digital video data.

The first multiplexer 312 receives write enable signals WenC and WenD in addition to the write enable signals Wena and WenB shown in FIG. 5, and performs switching control for outputting the input video signals to any of the first to fourth memory portions 30A–30D. The write enable signals WenA-D is switched for each corresponding period within a 1H period. For example, during the period when the data corresponds to the pixel location from the first to 400th pixels from the left end of the display area are input, the write enable signal WenA becomes an H level so that the data is written into the first memory portion 30A, and during the period when corresponding pixel location is from 401st to 800th pixels, the write enable signal WenB becomes an H level so that the data is written into the second memory portion 30B. Similarly, during the period when corresponding pixel location is from 801st to 1200th pixels, the write enable signals wenC becomes an H level so that the data is written into the third memory portion 30C and during the period when corresponding pixel location is from 1201st to 1600th pixels, the write enable signals WenD becomes an H level so that the data is written into the fourth memory portion 30D. Further, parallel data transfer is performed from each of the input-side line memories 32*a*~32*d* to the corresponding output-side line memory 34*a*–34*d* during a horizontal blanking period.

Each of the selectors 380A–380D is provided corresponding to one of the four memory portions 30A–30D for selecting, when receiving a predetermined selection signal, any of a plurality of outputs A-Out1~4, B-Out1~4, C-Out1-4, and D-Out1~4 provided at the corresponding output-side line memories 34*a*~34*d*, in accordance with the drive mode, such as forward scanning, backward scanning for partial or whole region, and mirror image display. The second multiplexer 392 receives data for each region from the selectors 380A~380D and selectively outputs the data to the D/A 500 based on a memory selection signal (for example 2 bits). In this embodiment, a digital to analog conversion function for at least four stages is required for the D/A 500. When a multiple-stage D/A, such as six-stage D/A 500 is used, two stage are not used, as already described in the second to fourth embodiments. The D/A 500 applies various adjustment treatments to the buffered data corresponding to four pixels, and perform digital to analog conversion to the data to generate analog voltage signals DV1, DV2, DV3 and DV4 according to the digital video data corresponding to each pixel, which are then output to the corresponding terminals TV1, TV2, TV3, and TV4 shown in FIG. 16.

When the LCD panel shown in FIG. 16 is driven by the drive IC having the above-described structure shown in FIGS. 17A and 17B, and the first gate line (250-1) is selected by the gate driver 205, and a total of four data lines 220 (220-*a*1, 220-*b*1, 220-*c*1, 220-*d*1) are selected via the corresponding outputs 221-*a*1, 221-*b*1, 221-*c*1, and 221-*d*1 and the corresponding switches SW21 by the data line selector 216, the data DV1 obtained by converting the output from the first memory portion 30A is then supplied to the terminal TV1 and the data DV2 obtained by converting the output from the second memory portion 30B is supplied to the terminal TV2. Similarly, the data DV3 obtained by converting the output from the third memory portion 30C is supplied to the terminal TV3 and the data DV4 obtained by converting the output from the fourth memory portion 30D is supplied to the terminal TV4. Accordingly, through the corresponding TFTs 260 controlled to be in an on-state by the gate driver 205, the data DV1–DV4 are applied to the pixel electrodes PX1, PX401, PX801, and PX1201, respectively.

During the subsequent four dot clock periods, the D/A 500 outputs the data corresponding to the next pixel in each region, which are then supplied to the corresponding terminals TV1–TV4. At this time, the data line selector 216 selects the data lines 220-*a*2, *b*2, *c*2, and *d*2, each of which is the second data line from the left in each region, and therefore the data DV1–DV4 are applied from the corresponding terminals TV1–TV4 to the pixel electrodes PX2, PX402, PX802, and PX1202, respectively, each of which is connected to the corresponding one of the selected data lines via the TFT 260. This process is repeated until all the data lines are selected in each region to complete the writing of display data corresponding 1H into each pixel electrode. When such writing process corresponding to 1H data is completed for all the gate lines, data writing into the pixels corresponding to one screen is completed.

Even when the LCD panel has less than 1600 pixels in the horizontal direction, such as an SXGA panel having 1280 pixels in the horizontal direction, is driven by the memory having the structure according to the fifth embodiment shown in FIGS. 17A and 17B in a manner that the panel is divided into four regions, the drive method which is similar to the foregoing method can be used only with a change that each of the selectors 380A–380D selects, of the outputs from the output-side line memories 34*a*~34*d*, the outputs A-D-Out2 corresponding to the output from the 320th FF34 in each memory portion. When the output Out2 is selected, the outputs from the 321st to 400th FFs34 in which data are not stored will not be used so as not to affect the display.

Further, when an XGA panel having 1024 pixels in the horizontal direction is driven in a four-region pattern by the memory structure of FIGS. 17A and 17B, the drive method similar to the foregoing method can be employed after a simple modification such that each of the selectors 380A–380D selects the output Out3 corresponding to the output of the 256th FF34 of the outputs of each memory.

Each of the foregoing first to fifth embodiments describes an example in which, in any one of the driving methods, each selector selects only one of the plurality of outputs (Out1-4, for example) in each memory at the same time. It is possible, however, that each selector simultaneously selects more than one output of Out1-4 in each memory portion so as to apply to the case where the display area is divided into three or more regions. For example, such a structure can be applied to the case where an SVGA panel having a total of 800 pixels in the horizontal direction is divided into four regions, namely, regions corresponding to the first (the pixel at the left end) to 200th pixels, the 201st to 400th pixels, the 401st to 600th pixels, and 601st to 800th pixels, and one of the terminals TV1–TV4 is provided for each region.

In such a case, the first and second memory portions 30A and 30B each having the maximum storage capacity corresponding to 400 pixels are provided, and Out1 and Out5 are provided corresponding to the outputs from the 400th and the 200th FFs34 of the output-side line memories 34*a*, 34*b* of FIG. 6, respectively, which are to be selected simultaneously. Thus, the first memory portion 30A supplies the data corresponding to the first pixel (corresponding to the A-Out1) and the data corresponding to the 201st pixel (corresponding to the A-Out5) simultaneously to the second multiplexer 390, while the second memory portion 30B supplies the data corresponding to the 401st pixel (corresponding to the B-Out1) and the data corresponding to the 601st pixel (corresponding to the B-Out5) simultaneously to the second multiplexer 390. The data are then converted by the D/A 500 into the corresponding analog data DV1–DV4 which are supplied to the corresponding terminals TV1–TV4. When the data line selector selects corresponding one data line for each region, namely four data lines in total, the driving of four-region dividing can be performed.

The function of the above-mentioned outputs Out1~4 of the memory can be summarized as follows. First, as described in each of the first to fifth embodiments, the Out1 of the memory (a memory having a storage capacity corresponding to a total of 400 pixels) is used for forward scanning in cases where an SVGA panel having 800 pixels in the horizontal direction is divided into two regions and where a UXGA panel having 1600 pixels in the horizontal direction is divided into four regions, to output the outputs of the 400th FF34, namely the data corresponding to the first or the 401st pixel of the display area.

When the Out2 is selected, the data held in the 320th to first FFs34 are sequentially obtained, while the data held in the 321st to 400th FFS34 are not used. Accordingly, the Out2 can be used in a line memory having a storage capacity corresponding to 400 pixels in cases where a VGA panel having 640 pixels in the horizontal direction is horizontally divided into two regions and where an SXGA having 1280 pixels in the horizontal direction is horizontally divided into four regions or some such pattern.

Further, when the Out3 is selected, the data held in the 256th to first FFs34 are sequentially obtained, while the data held in the 257th to 400th FFs34 are not used. Accordingly, the Out2 can be used in a line memory having a storage capacity corresponding to 400 pixels in case where a XGA panel having 1024 pixels in the horizontal direction is horizontally divided into four regions. The Out2 can be also used when a panel having 518 pixels in the horizontal direction is horizontally divided into two regions or the like.

The Out4, which corresponds to the output of data held in the first FF34, is selected in a case where it is necessary to output the held data in the order opposite to the order a video signal was input, when performing backward scanning or mirror image display. When the Out4 is used, the data shift direction of the shift direction switching circuit 340 shown in FIGS. 6A and 6B must be controlled to the left direction.

Although the selectors for selecting the output from the memory portions are provided between the memory portions 30 and the second multiplexer in the above-described first to fifth embodiments, the selectors may be eliminated. In that case, the output from the memory portions may be directly selected by the second multiplexer or a terminal may be separately provided to determine which of the outputs Out1~4 to be selected after the IC is manufactured.

Although for ease of understanding the above descriptions are made in connection with a monochrome display device, the above descriptions may, of course, be applied to a color display device, though in a color display device, additional memory portions in accordance with the number of primary colors in color display are further required in the memory structure described in the first to fifth embodiments. For example, when data of three colors of RGB is displayed in a dividing manner in the two horizontal regions, a set of first and second memory portions is required for each of the three colors, so that a total of six memory portions are necessary. Alternatively, in a case of two-region three-phase driving, three-phase data DV1–DV3 and DV4~DV6 each assigned for the divided region, may correspond to the R, G, B data respectively in each region. In this case, when a digital video signal input from an outside source is supplied as R, G, B data, respectively, it is preferable, for example that the first multiplexer 310 integrates the data corresponding each color to allot output of the data between the first and second memory portions 30A and 30B.

The foregoing embodiments describe an example in which an LCD panel is driven by the drive IC of the present invention. However, a display panel using an electroluminescence element in each pixel and other flat display panels may also driven by the IC of the present invention. In the case of an EL panel, for example, a voltage DV1~DV6 to be applied to the EL element provided for each pixel corresponds to the above-mentioned data voltage DV1~DV6 to be applied to each of the pixel electrodes. When a CRT (cathode ray tube) is used for a panel, an electronic acceleration voltage in each pixel corresponds to each of the above-mentioned data voltages VD1~DV6 to be applied to each pixel electrode.

As described above, the structure of the drive IC for use in the display device according to the present invention can deal with any of the various display methods including (1) driving for display panels having different number of pixels, (2) backward scan driving, (3) mirror image display, and (4) driving in a region dividing manner, without changing the structure.

The input side shift register and the output side shift register capable of execution of data shift within a memory are used for holding data in the above-mentioned input side line memory 32 and the output side line memory 34, respectively. However, it is also possible to hold data in other memories, such as an SRAM, a DRAM, and or an ASIC. While the preferred embodiments of the present invention have been described using specific terms, such description is for illustrative purposes only, and it is to be understood that changes and variations may be made without departing from the spirit or scope of the appended claims.

What is claimed is:

1. A signal processing circuit for processing an input digital video data and producing display data for a display unit divided into a plurality of regions to be driven, comprising:

a data separation portion for performing assignment of said input digital video data; and a plurality of memory portions for storing the digital data which is digital video data assigned by said data separation portion; each of said memory portions including an input-side line memory having a data storage capacity equal to or greater than the number of pixels of said display unit in a horizontal direction divided by the number of said regions to be driven and sequentially receiving and storing said digital data, and an output-side line memory for holding the serial data stored in said input-side line memory and transferred in parallel from said input-side line memory and having a plurality of output portions capable of serially outputting the data held therein from prescribed positions different from each other; wherein selection is made among said plurality of output portions of said output-side line memory in accordance with the number of pixels of said display unit in a horizontal direction, and serial output data is supplied from the selected output portion in each of said plurality of memory portions to said display unit as analog display data;

each of the plurality of output portions of the output-side line memory has a plurality of memory units and is configured as a shift register;

each of the shift registers has an output memory unit and data stored in the shift register is shifted and serially output from the output memory unit; and the output memory units define the prescribed positions different from each other.

2. The signal processing circuit recited in claim 1, wherein the number of said plurality of memory portions provided in said circuit is determined corresponding to the number of regions into which said display unit is divided in a horizontal direction.

3. The signal processing circuit recited in claim 1, wherein said input-side line memory is an n-stage input side shift register for sequentially holding said digital data received at a data input terminal of a first stage, the number n being equal to or greater than the number of pixels of said display unit in a horizontal direction divided by the number of said regions, and said output-side line memory includes an n-stage output side shift register having the same number of stages as said input side shift register, and an input data switch circuit for switching, as input data for each stage of said n-stage output side shift register, output data which can be transferred in parallel from each stage of said n-stage input side shift register, and output data shifted from an immediately preceding or succeeding stage of said n-stage output side shift register.

4. The signal processing circuit recited in claim 3, wherein said plurality of output portions are each uniquely connected to a data output in a predetermined and different stage of said n-stage output side shift register.

5. The signal processing circuit recited in claim 1, wherein the data storage capacities of said input-side line memory and of said output-side line memory correspond to 400 pixels or 512 pixels.

6. The signal processing circuit recited in claim 1, wherein said plurality of output portions of said output-side line memory can output serial data in a sequential manner starting from a $400^{th}$, a $320^{th}$, and a $256^{th}$ data item counting from a last input data item of said digital data serially input to said input-side line memory.

7. The signal processing circuit recited in claim 6, wherein one of said plurality of output portions of said output-side line memory outputs the data in a serial manner starting from the last input data item of said digital data serially input to said input-side line memory.

8. The signal processing circuit recited in claim 1, wherein the number of said plurality of memory portions is equal to the product of the number of regions into which said display unit is divided in a horizontal direction and a number of primary colors displayed at said display unit, and said memory portions respectively receive said digital video signals corresponding to the regions and/or primary colors different from each other.

9. The signal processing circuit recited in claim 1, wherein said input digital video signal is input every horizontal scanning period, and parallel data transfer from said input-side line memory to said output-side line memory is performed during a horizontal blanking period.

10. A signal processing circuit for processing an input digital video signal and producing display data for a display unit divided into a plurality of regions to be driven, comprising:

a data separation portion for performing assignment of input digital video data;

a plurality of memory portions for storing the digital data which is digital video data assigned by said data separation portion; each of said memory portions including an input-side line memory having a data storage capacity equal to or greater than the number of pixels of said display unit in a horizontal direction divided by the number of said regions to be driven and sequentially receiving and storing said digital data, and an output-side line memory for holding the serial data stored in said input-side line memory and transferred in parallel from said input-side line memory and having a plurality of output portions capable of serially outputting the data held therein from prescribed positions different from each other; and an output selector for selecting among said plurality of output portions of said output-side line memory in accordance with the number of pixels of said display unit in a horizontal direction; wherein the serial output data supplied from each of said plurality of memory portions through said output selector is converted into analog data and the converted data is supplied to said display unit as display data by a digital-analog conversion processing portion;

each of the plurality of output portions of the output-side line memory has a plurality of memory units and is configured as a shift register;

each of the shift registers has an output memory unit and data stored in the shift register is shifted and serially output from the output memory unit; and the output memory units define the prescribed positions different from each other.

11. The signal processing circuit recited in claim 10, wherein said input-side line memory is an n-stage input side memory for sequentially holding said digital data received at a data input terminal of a first stage, the number n being equal to or greater than the number of pixels of said display unit in a horizontal direction divided by the number of said regions, and said output-side line memory includes an n-stage output side memory having the same number of stages as said input side memory, and an input data switch circuit for switching, as input data for each stage of said n-stage output side memory, output data which can be transferred in parallel from each stage of said n-stage input side memory, and output data shifted from an immediately preceding or succeeding stage of said n-stage output side memory.

12. The signal processing circuit recited in claim 11, wherein said output-side line memory further includes a shift direction switch circuit for switching a data shift direction in said n-stage output side memory to an m−1 (where m<n) stage direction or an m+1 stage direction.

13. The signal processing circuit recited in claim 12, wherein said plurality of output portions of said output-side line memory at least include the output portion connected to a data output of the first stage of said n-stage output side memory and the output portion connected to the data output of k stage, where 1<k<n.

14. The signal processing circuit recited in claim 13, wherein in one of said plurality of memory portions, the output portion connected to the data output of said k stage is selected among said plurality of output portions of said output side memory, and data is read out from said output side memory following the order in which data is input to said input side memory, and in the other of said plurality of memory portions, the output portion connected to the data output of said first stage is selected among the plurality of output portions, and data is read out from said output side memory in the reverse order from which data is input to said input side memory.

15. The signal processing circuit recited in claim 14, wherein the data items stored in said plurality of memory portions are the digital video signals corresponding to adjacent regions of said display unit.

16. The signal processing circuit recited in claim 14, wherein, when a mirror image signal is input to said output selector, said output selector selects the output portion connected to the data output of the k stage among the plurality of output portions of said output side memory for said one of said plurality of memory portions, and selects the output portion connected to the data output of the first stage among said plurality of output portions for said other of said plurality of memory portions.

17. The signal processing circuit recited in claim 13, wherein the numbers n and k are any of 512, 400, 320, and 256.

18. The signal processing circuit recited in claim 13, wherein the number of said plurality of memory portions is equal to the product of the number of regions into which said display unit is divided in a horizontal direction and a number of primary colors displayed at said display unit, and said memory portions respectively receive said digital video signals corresponding to the regions and/or primary colors different from each other.

19. The signal processing circuit recited in claim 10, wherein said input digital video signal is input every horizontal scanning period, and parallel data transfer from said input-side line memory to said output-side line memory is performed during a horizontal blanking period.

* * * * *